(12) United States Patent
Muchlinski et al.

(10) Patent No.: US 10,714,122 B2
(45) Date of Patent: Jul. 14, 2020

(54) SPEECH CLASSIFICATION OF AUDIO FOR WAKE ON VOICE

(71) Applicant: Intel Corporation, Santa Clara, CA (US)

(72) Inventors: Maciej Muchlinski, Gdansk (PL); Tobias Bocklet, Munich (DE)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 16/001,496

(22) Filed: Jun. 6, 2018

(65) Prior Publication Data
US 2019/0043529 A1 Feb. 7, 2019

(51) Int. Cl.
*G10L 25/78* (2013.01)
*G10L 25/84* (2013.01)
(Continued)

(52) U.S. Cl.
CPC ............. *G10L 25/84* (2013.01); *G10L 15/02* (2013.01); *G10L 15/22* (2013.01); *G10L 25/87* (2013.01); *G10L 15/063* (2013.01); *G10L 15/14* (2013.01); *G10L 15/142* (2013.01); *G10L 15/16* (2013.01); *G10L 2015/088* (2013.01)

(58) Field of Classification Search
CPC ....... G10L 15/16; G10L 15/02; G10L 15/063; G10L 25/30; G10L 15/142; G10L 17/18; G10L 25/15; G10L 15/144; G10L 2015/226; G10L 2015/0635; G10L 25/51; G10L 25/84; G10L 25/78; G10L 15/14; G10L 15/20; G10L 21/02; G10L 15/26; G10L 17/06; G10L 2025/783; G10L 15/08; G10L 15/22; G10L 2015/088;
(Continued)

(56) References Cited

U.S. PATENT DOCUMENTS 5,384,893 A 1/1995 Hutchins
6,138,095 A 10/2000 Gupta et al.
(Continued)

FOREIGN PATENT DOCUMENTS

WO 2017091270 6/2017

OTHER PUBLICATIONS

Chen, et al., "Small-Footprint Keyword Spotting Using Deep Neural Networks", 2014 IEEE International Conference on Acoustics, Speech and Signal Processing (ICASSP), pp. 4087-4091; May 4-9, 2014.
(Continued)

*Primary Examiner* — Huyen X Vo
(74) *Attorney, Agent, or Firm* — Green, Howard & Mughal LLP

(57) ABSTRACT

Speech or non-speech detection techniques are discussed and include updating a speech pattern model using probability scores from an acoustic model to generate a score for each state of the speech pattern model, such that the speech pattern model includes a first non-speech state having multiple self loops each associated with a non-speech probability score of the probability scores, a plurality of speech states following the first non-speech state, and a second non-speech state following the speech states, and detecting speech based on a comparison of a score of the first non-speech state and a score of the last speech state of the multiple speech states.

25 Claims, 8 Drawing Sheets

(51) Int. Cl.
  *G10L 15/02* (2006.01)
  *G10L 15/22* (2006.01)
  *G10L 25/87* (2013.01)
  G10L 15/06 (2013.01)
  G10L 15/08 (2006.01)
  G10L 15/14 (2006.01)
  G10L 15/16 (2006.01)

(58) Field of Classification Search
  CPC ... G10L 2015/223; G10L 25/09; G10L 25/18; G10L 25/24; G10L 25/90
  See application file for complete search history.

(56) References Cited

U.S. PATENT DOCUMENTS

| | | | |
|---|---|---|---|
| 6,205,424 B1 | 3/2001 | Goldenthal et al. | |
| 6,480,827 B1 | 11/2002 | McDonald | |
| 7,139,714 B2 | 11/2006 | Bennett et al. | |
| 7,457,748 B2 | 11/2008 | Nefti et al. | |
| 7,487,091 B2 | 2/2009 | Miyazaki | |
| 7,603,278 B2 | 10/2009 | Fukada et al. | |
| 7,720,683 B1 | 5/2010 | Vermeulen et al. | |
| 8,255,215 B2 | 8/2012 | Li et al. | |
| 8,527,271 B2 | 9/2013 | Wandinger et al. | |
| 8,818,802 B2 | 8/2014 | Fastow et al. | |
| 9,070,367 B1 | 6/2015 | Hoffmeister | |
| 9,299,338 B2 | 3/2016 | Kato | |
| 9,368,105 B1 | 6/2016 | Freed et al. | |
| 9,401,140 B1 | 7/2016 | Weber et al. | |
| 9,484,030 B1 | 11/2016 | Meaney et al. | |
| 9,646,613 B2 | 5/2017 | Blouet | |
| 9,792,097 B2 | 10/2017 | Glendenning et al. | |
| 9,792,907 B2 | 10/2017 | Bocklet et al. | |
| 9,972,313 B2 | 5/2018 | Bocklet et al. | |
| 2002/0062212 A1* | 5/2002 | Nakatsuka | G10L 15/065 704/240 |
| 2002/0087314 A1 | 7/2002 | Fischer et al. | |
| 2007/0285505 A1 | 12/2007 | Korneliussen | |
| 2008/0281599 A1 | 11/2008 | Rocca | |
| 2010/0198598 A1 | 8/2010 | Herbig et al. | |
| 2010/0324900 A1 | 12/2010 | Faifkov et al. | |
| 2012/0166194 A1 | 6/2012 | Jung et al. | |
| 2012/0173234 A1* | 7/2012 | Fujimoto | G10L 15/20 704/233 |
| 2012/0245934 A1 | 9/2012 | Talwar et al. | |
| 2013/0289994 A1 | 10/2013 | Newman et al. | |
| 2014/0025379 A1 | 1/2014 | Ganapathiraju et al. | |
| 2014/0058731 A1 | 2/2014 | Tyagi et al. | |
| 2014/0079297 A1 | 3/2014 | Tadayon | |
| 2014/0129224 A1 | 5/2014 | Chien | |
| 2014/0136200 A1 | 5/2014 | Winter et al. | |
| 2014/0172428 A1 | 6/2014 | Han | |
| 2014/0200890 A1 | 7/2014 | Kurniawati et al. | |
| 2014/0278435 A1 | 9/2014 | Ganong et al. | |
| 2014/0337030 A1 | 11/2014 | Lee et al. | |
| 2014/0337031 A1 | 11/2014 | Kim et al. | |
| 2014/0358539 A1 | 12/2014 | Rao et al. | |
| 2015/0025890 A1 | 1/2015 | Jagatheesan et al. | |
| 2015/0066495 A1 | 3/2015 | Zhang et al. | |
| 2015/0073795 A1 | 3/2015 | Tan | |
| 2015/0081296 A1 | 3/2015 | Lee et al. | |
| 2015/0095027 A1 | 4/2015 | Parada San Martin et al. | |
| 2015/0154953 A1 | 6/2015 | Bapat et al. | |
| 2015/0279358 A1 | 10/2015 | Kingsbury et al. | |
| 2015/0302847 A1 | 10/2015 | Yun et al. | |
| 2015/0340032 A1 | 11/2015 | Gruenstein | |
| 2015/0371631 A1 | 12/2015 | Weinstein et al. | |
| 2015/0371633 A1 | 12/2015 | Chelba | |
| 2016/0066113 A1 | 3/2016 | Elkhatib et al. | |
| 2016/0071516 A1 | 3/2016 | Lee et al. | |
| 2016/0098999 A1 | 4/2016 | Jacob et al. | |
| 2016/0111086 A1 | 4/2016 | Ziolko et al. | |
| 2016/0140956 A1* | 5/2016 | Yu | G10L 15/16 704/240 |
| 2016/0180839 A1 | 6/2016 | Tomita | |
| 2016/0188573 A1 | 6/2016 | Tang | |
| 2016/0189706 A1 | 6/2016 | Zopf et al. | |
| 2016/0379632 A1 | 12/2016 | Hoffmeister et al. | |
| 2016/0379638 A1 | 12/2016 | Basye et al. | |
| 2017/0004824 A1 | 1/2017 | Yoo et al. | |
| 2017/0133038 A1 | 5/2017 | Jiang et al. | |
| 2017/0148444 A1 | 5/2017 | Bocklet et al. | |
| 2017/0270919 A1 | 9/2017 | Parthasarathi | |
| 2017/0294188 A1 | 10/2017 | Hayakawa | |
| 2018/0005633 A1 | 1/2018 | Bocklet et al. | |
| 2018/0121796 A1 | 5/2018 | Deisher et al. | |
| 2018/0182388 A1 | 6/2018 | Bocklet et al. | |
| 2018/0261218 A1 | 9/2018 | Bocklet et al. | |
| 2018/0322876 A1 | 11/2018 | Bocklet et al. | |
| 2019/0043479 A1 | 2/2019 | Dorau et al. | |
| 2019/0043488 A1 | 2/2019 | Bocklet et al. | |

OTHER PUBLICATIONS

Rose, et al., "A Hidden Markov Model Based Keyword Recognition System", 1990 ICASSP-90, vol. 1, 1990 International Conference on Acoustics, Speech, and Signal Processing, pp. 129-132; Apr. 3-6, 1990.

Zhang, et al., "Unsupervised Spoken Keyword Spotting via Segmental DTW on Gaussian Posteriorgrams", in Proceedings of Automatic Speech Recognition & Understanding Workshop (ASRU 2009), IEEE, 2009, Merano, pp. 398-403; Dec. 2009.

Sackinger, et al., "Application of the ANNA Neural Network Chip to High-Speed Character Recognition", Mar. 18, 1991.

European Search Report for EP Patent Application No. 19172588.6, dated Oct. 14, 2019.

Fujimoto, et al., "Frame-wise model re-estimation method based on Gaussian pruning with weight normalization for noise robust voice activity detection", Speech Communication, Elsevier Science Publishers, Amsterdam, NL, vol. 54, No. 2, Aug. 25, 2011, pp. 229-244.

Li, et al., "Robust Endpoint Detection and Energy Normalization for Real-Time Speech and Speaker Recognition", IEEE Transactions on Speech and Audio Processing, vol. 10, No. 3, Mar. 1, 2002.

* cited by examiner

SPEECH CLASSIFICATION OF AUDIO FOR WAKE ON VOICE

BACKGROUND

Robust low-power speech/non-speech detection performed on-the-fly provides important information for further processing of an input audio signal. As the name suggests, speech/non-speech detection categorizes received audio input as speech or non-speech. Applications for such technology include speech detection for always listening devices, accuracy improvements for audio preprocessing, beam forming, and text-independent speaker identification. For example text-independent speaker identification (SID) systems have improved accuracy when analysis is based only on real speech signals while silence and noise segments are removed. Furthermore, for text-dependent SID, speech detection may be performed by wake on voice in low power systems.

Current speech/non-speech detection may rely on sample-based voice activity detection that rely on audio signal characteristics such as short term energy of the signal and zero crossing rates. However, such detection systems are not accurate and have high false positive and false negative rates. Other techniques include frequency-based voice activity detection that provide frequency domain analysis (e.g., after application of a fast Fourier transform) of energy in certain frequency bands. However, such techniques have similar limitations of low accuracy.

As such, existing techniques do not provide high quality low resource speech/non-speech classification. Such problems may become critical as the desire to implement wake on voice, always listening devices, and the like becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
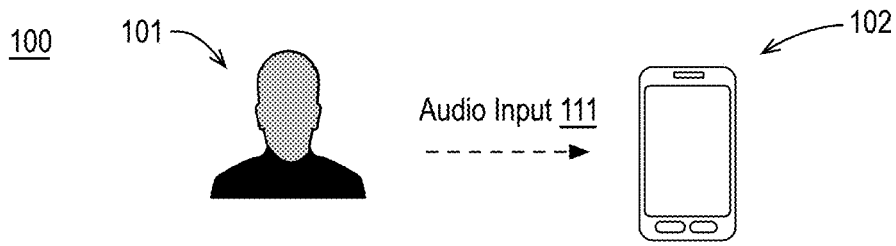
FIG. 1 is an illustrative diagram of an example setting for providing speech or non-speech classification.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to speech or non-speech classification for received audio input.

As described above, speech or non-speech detection of received audio input may be implemented in always listening devices, in wake on voice implementations, in beam forming (e.g., by detecting speech and spatially filtering the received audio based on the direction of the detected speech), in independent speaker identification, in audio preprocessing (e.g., by applying the appropriate preprocessing to speech or non-speech audio input signals), etc. As used herein, the term speech indicates an audio input or signal includes human speech including spoken noise and the term non-speech indicates the audio input or signal includes any other audio such as silence or non-spoken noise.

Embodiments discussed herein include generating, based on received audio input, probability scores each corresponding to an audio unit such as a detectable audio unit. For example, the received audio input may be used to generate a series of feature vectors or audio frames for evaluation. Each feature vector or audio frame is scored by an acoustic model such as, for example, a deep neural network acoustic model. For each feature vector or audio frame, the probability scores are provided as an output of the acoustic model. Each probability score indicates a probability (e.g., a probability density function score) that the feature vector or audio frame corresponds to a particular audio unit that may correspond to silence, noise, a unit of speech, etc. As used herein the term audio unit indicates content of a temporal portion of an audio signal such as a silence audio unit including silence, a noise audio unit including noise, a speech audio unit including speech, which may be a sub-phonetic unit such as a tied context-dependent triphone state, and so on. Such terms are discussed further herein below.

Subsequent to scoring by the acoustic model, the resultant probability scores are used to update a speech pattern model having a first non-speech state followed by any number of speech states, which are followed by a second non-speech state. The first non-speech state includes self-loops corresponding to non-speech probability scores from the acoustic model. That is, the non-speech probability scores correspond to the modeled non-speech audio units and represent a probability a temporal portion of the received audio input, as represented by the feature vector or audio frame, includes the non-speech audio unit (relative to the other audio units of the acoustic model). In some embodiments, at each scoring update of the speech pattern model, the score of the first non-speech state is the sum of the previous score of the first non-speech state (e.g., at a previous update instance) and a maximum of the non-speech probability scores from the acoustic model.

The first non-speech state is connected to a first speech state of the speech states by transitions corresponding to the speech probability scores from the acoustic model. The speech probability scores correspond to the modeled speech audio units (e.g., tied context-dependent triphone states representative of portions of speech) and represent a probability a temporal portion of the received audio input, as represented by the feature vector or audio frame, includes the speech audio unit (relative to the other audio units of the acoustic model). In some embodiments, at each scoring update of the speech pattern model, the score of the first speech state is the sum of the previous score of the first non-speech state (e.g., at a previous update instance) and a maximum of the speech probability scores from the acoustic model. Each of the subsequent speech states of the speech pattern model are connected to previous speech states by transitions corresponding to the speech probability scores from the acoustic model. In some embodiments, at each scoring update of the speech pattern model, the score of each speech state is the sum of the previous score of the previous speech state (e.g., at a previous update instance for the speech state before the current speech state) and a maximum of the speech probability scores from the acoustic model. Optionally, a final speech state prior to the second non-speech state includes self-loops corresponding to the speech probability scores from the acoustic model. The final speech state may then, at each scoring update, be a sum of the previous score of the final speech state and maximum of the speech probability scores from the acoustic model.

The second non-speech state is connected to the final speech state by transitions corresponding to the non-speech probability scores from the acoustic model or silence probability scores from the acoustic model. In some embodiments, at each scoring update of the speech pattern model, the score of the second non-speech state is a sum of the previous score of the final speech state and a maximum of the non-speech probability scores from the acoustic model.

After each update, the speech pattern model may be evaluated to determine whether speech is detected. In an embodiment, the score of the final speech state and the first non-speech state are compared to determine whether speech is detected. For example, when the final speech state exceeds the first non-speech state by a threshold amount, a determination is made that speech has been detected. Furthermore, the speech pattern model may be evaluated to determine an end of speech by comparing the second non-speech state to the final speech state. In an embodiment, when the second non-speech state exceeds the final speech state, an end of speech is detected. Such an end of speech time stamp may be provided to a subsequent audio processing unit for example. In an embodiment, the speech pattern model may also be evaluated to determine a start of speech. For example, when the first speech state exceeds the first non-speech state, a begin of speech is detected. The begin of speech time stamp may also be provided, when a subsequent speech detection is made as discussed above, to a subsequent audio processing unit. In some embodiments, the begin of speech detection may be used, even prior to speech detection, to power up an audio buffer or for other system processing.

Such speech detection and detection of start and stop times of the detected speech signal may be used in a wide variety of contexts to improve audio processing by a device.

FIG. 1 is an illustrative diagram of an example setting 100 for providing speech or non-speech classification, arranged in accordance with at least some implementations of the present disclosure. As shown in FIG. 1, setting 100 may include a user 101 providing audio input 111 to a device 102. For example, device 102 may be in a deep sleep or power saving mode or the like and user 101 may be attempting to wake device 102 via speech. If user 101 provides audio input 111 that is identified as speech, device 102 may wake from a sleep or power saving mode, perform a task, or the like. For example, device 102 may provide an always listening capability or an automatic wake on voice capability for user 101. As shown, in some examples, an always listening capability or an automatic wake on voice system may be implemented via device 102 such that device 102 may be a smartphone. However, device 102 may be any suitable device such as a computer, a laptop, an ultrabook, a smartphone, a tablet, a phablet, a wearable device such as a smart watch or eye glasses, or the like. In any case, device 102 may be described as a computing device as used herein.

Furthermore, device 102 may provide other capabilities in response to speech being detected. For example, device 102 may alter audio preprocessing in response to a detected speech signal (e.g., performing a first type of audio processing on detected speech as a second type of audio processing different than the first type when speech is not detected), provide beam forming in response to a detected speech signal (e.g., detecting a direction of the speech and spatially filtering an input signal), begin speaker identification processing (e.g., key phrase detection) in response to a detected speech signal, perform phrase segmentation in response to a detected speech signal (e.g., performing speech detection only on the temporal portion of received audio corresponding to the detected speech signal), transmitting a portion of audio input 111 from device 102 to a server or cloud computing platform in response to a detected speech signal (e.g., transmitting the portion of audio input 111 having speech for automatic speech recognition or stopping transmission of audio when end of speech is detected), etc.

As shown, in some examples, user 101 may provide audio input 111 in an attempt to wake device 102 or the like. As will be appreciated, device 102 may also receive as audio input background noise, silence, background speech, spoken noise, speech not intended to attain access to device 102, etc. For example, device 102 may need to differentiate or classify audio (e.g., audio input 111 or other audio) that includes speech from audio that does not include speech.

Figure 2:
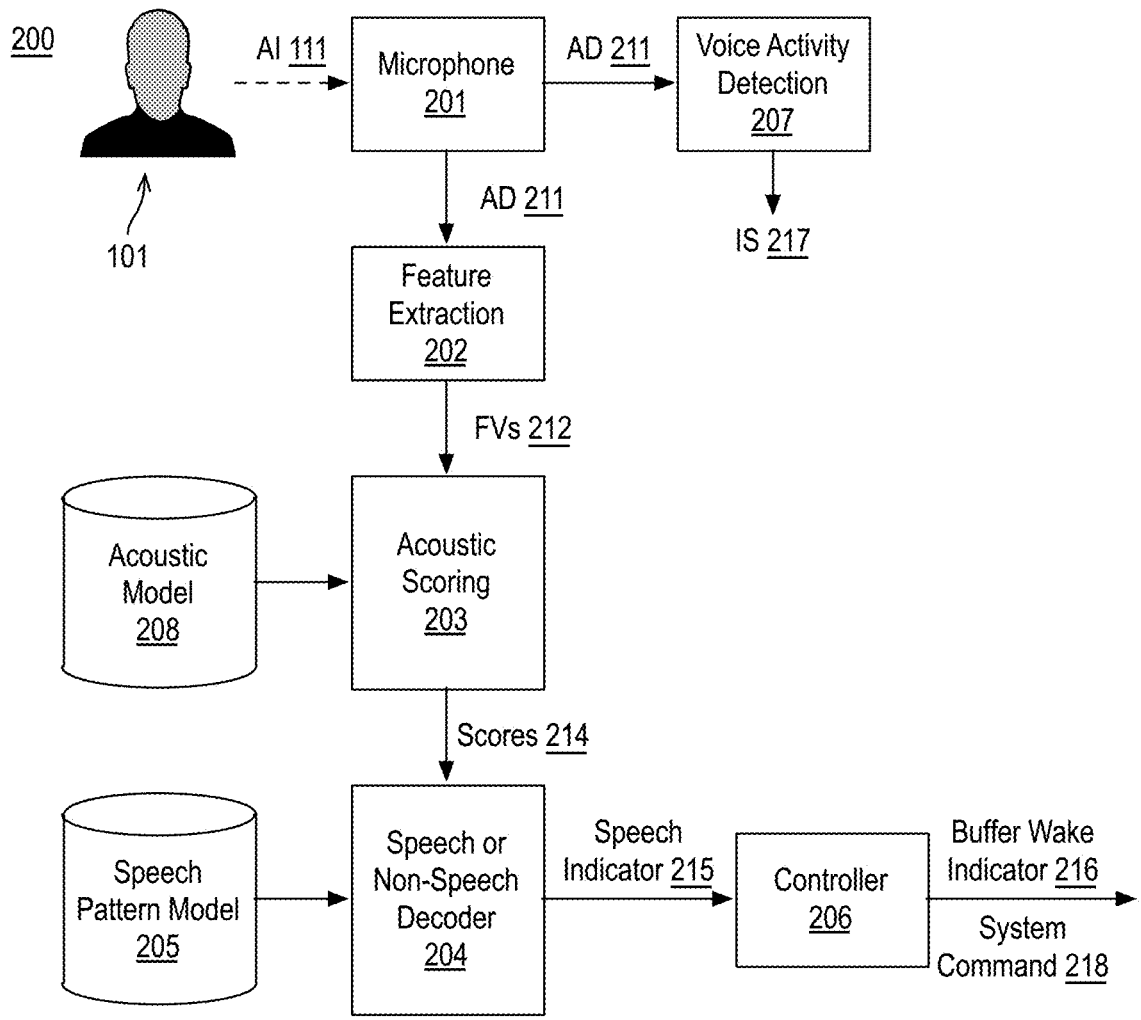
FIG. 2 is an illustrative diagram of an example system for providing speech or non-speech classification.

FIG. 2 is an illustrative diagram of an example system 200 for providing speech or non-speech classification, arranged in accordance with at least some implementations of the present disclosure. As shown in FIG. 2, system 200 may include a microphone 201, a feature extraction module 202, an acoustic scoring module 203, a speech or non-speech decoder 204, a speech pattern model 205, a controller 206, an acoustic model 208, and a voice activity detection module 207. For example, as shown in FIG. 2, speech or non-speech decoder 204 may provide a speech indicator 215 to controller 206. Speech indicator 215 may include an indicator of speech being detected and other data such as a start of speech detection time for the speech signal, a duration of the speech signal, an end of speech detection time for the speech signal, or other indicators or data as discussed herein. Based on speech indicator 215 (e.g., if speech is indicated), controller 206 may provide an audio buffer wake indicator 216, a system command 218, or other commands or instructions. In an embodiment, buffer wake indicator 216 includes a command to start or wake an audio buffer implemented via memory (not shown). For example, the audio buffer may perform audio buffering using a larger audio buffering than that provided with respect to voice activity detection module 207.

System command 218 may be any suitable command such as a command to perform speech audio processing on the speech signal, a command to perform beam forming using the speech signal and/or further detected audio, a command to transmit speech signal and/or further detected audio to a cloud service, to stop transmission to a cloud service, etc. In an embodiment, system command 218 includes a command to perform automatic speech recognition based on audio input 111. In an embodiment, system command 218 includes a command to perform speech audio preprocessing on audio input 111. For example, speech audio preprocessing may include processing tuned to speech such as particular audio filtering, audio sampling, etc. such that speech audio processing is not performed on audio input 111 absent system command 218. In an embodiment, system command 218 includes a command to transmit audio input 111 to a cloud service for automatic speech recognition, key phrase detection, or other audio processing. In an embodiment, system command 218 includes a command to stop transmission of audio input 111 to a cloud service. For example, system 200 may be always listening, which is halted when user 101 begins interaction with system 200. As is discussed further herein, in some embodiments, feature extraction module 202, acoustic scoring module 203, speech or non-speech decoder 204, controller 206, and voice activity detection module 207 may be implemented via a digital signal processor (DSP).

As shown, microphone 201 may receive audio input (AI) 111 from user 101 (or multiple users or an environment or the like). In some examples, audio input 111 is issued by user 101 to wake system 200 and/or to have system 200 perform an operation. As discussed, microphone 201 may receive audio input that is not intended to wake system 200 or other background noise or even silence. For example, audio input 111 may include any speech issued by user 101 and any other background noise or silence or the like in the environment of microphone 201. Audio input 111 may be characterized as audio, input audio, an input speech stream, or the like. Microphone 201 may receive audio input 111 and/or other audio (e.g., as sound waves in the air) and convert audio input 111 and/or such other audio to an electrical signal such as a digital signal to generate audio data (AD) 211. For example, audio data 211 may be stored in memory (not shown in FIG. 2), transferred for continued processing, etc.

As shown, voice activity detection module 207 may receive audio data 211. For example, voice activity detection module 207 may operate (e.g., via a DSP) even in a deep sleep mode of system 200 to continuously monitor audio data 211. Upon detection of a voice or other sound that requires further evaluation by system 200, voice activity detection module 207 may provide initiation signal (IS) 217, which may activate the other modules of system 200 to provide speech or non-speech classification. In an embodiment, voice activity detection module 207 is prior to feature extraction module 202 and operates to block feature extraction unless voice activity detection module 207 detects a voice or other sound that requires evaluation. For example, voice activity detection module 207 may provide initiation signal 217 to feature extraction module 202 to activate feature extraction module 202 and other components of system 200. In an embodiment, a portion of audio data 211 (e.g., 360 ms of audio data or the like) may be buffered by a ring-buffer or the like. When a voice or other sound that requires further evaluation is detected by voice activity detection module 207, feature extraction module 202 may receive the data from the buffer and further incoming audio via audio data 211. As discussed, in some embodiments, speech detection as indicated by speech indicator 215 may cause controller 206 to issue buffer wake indicator 216, which may cause an audio buffer to start or wake. The buffer initiated by buffer wake indicator 216 may buffer substantially more audio data than the discussed buffer for voice activity detection module 207 such as 1 to 2 seconds of audio data.

If speech is detected, as discussed herein, system 200 may enter a higher level mode of operation for user 101 such as a higher power mode. Furthermore, voice activity detection module 207 may operate during speech detection (e.g., while speech is not detected or not yet detected) to determine whether system 200 may be put back into a deep sleep mode or the like. For example, voice activity detection module 207 may provide a low power always listening capability for system 200. For example, upon activation by initiation signal 217, audio data 211 may be continuously monitored for speech detection until controller 206 determines speech has been detected, as indicated by speech indicator 215, and buffer wake indicator 216 and/or system command 218 are provided or until a determination is made by voice activity detection module 207 to reenter a sleep mode or low power state or the like.

As discussed, feature extraction module 202 may receive audio data 211. For example, feature extraction module 202 may receive audio data 211 from microphone 201, from the discussed buffer, from other memory of system 200, or the like and feature extraction module 202 may generate feature vectors 212 associated with audio input 111. Feature vectors 212 may be any suitable features or feature vectors or the like representing audio input 111. For example, feature vectors 212 may be a time series of feature vectors (e.g., feature vectors each generated for an instance of time) such that each of feature vectors 212 includes a stack of features or feature vectors each from an instance of time such as a sampling time or the like. Feature vectors 212 may be characterized as vectors, audio vectors, stacked vectors, audio frames, frames of audio data, etc.

Figure 3:
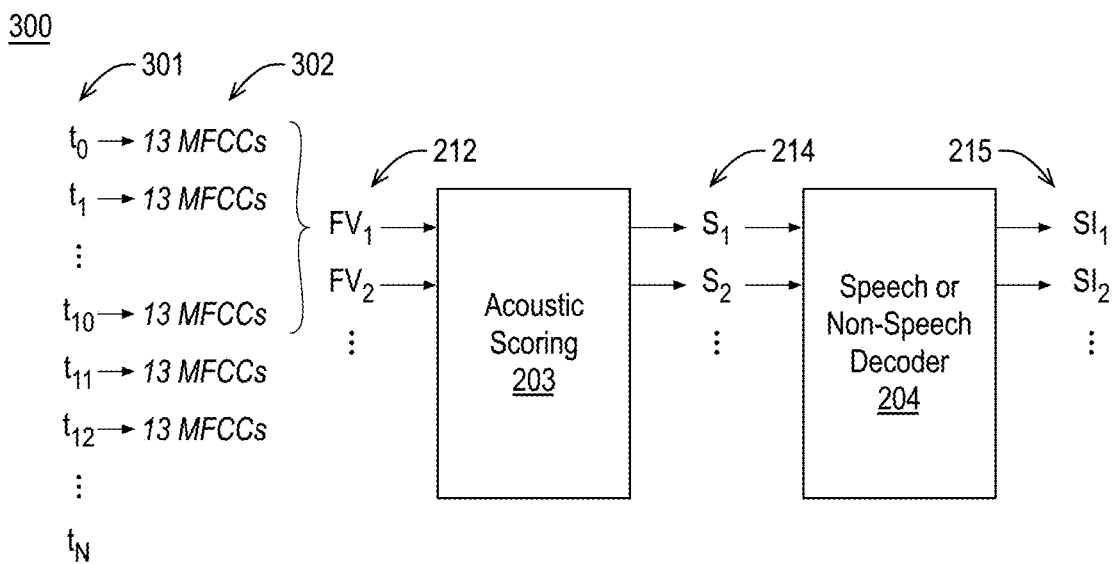
FIG. 3 illustrates example data structures associated with speech or non-speech classification.

FIG. 3 illustrates example data structures 300 associated with speech or non-speech classification, arranged in accordance with at least some implementations of the present disclosure. As shown in FIG. 3, at each of multiple sampling times 301 (e.g., represented as sampling times $t_0, t_1, \ldots, t_N$), sampling coefficients 302 such as Mel frequency cepstrum coefficients (MFCCs) or the like may be generated. Sampling times 301 may be at any suitable interval such as every 10 ms or the like and the sampling performed at each sampling time of sampling times 301 may sample any duration of input speech or audio such as 25 ms of audio or the like. Sampling coefficients 302 may include any number of sampling coefficients such as 13 coefficients as in the illustrated example. Furthermore, sampling coefficients 302 may each be referred to as features, a feature vector, a sampling, or the like. For example, sampling coefficients 302 may be coefficients representing a power spectrum of the received audio. As discussed, in an embodiment, sampling coefficients 302 are Mel frequency cepstrum coefficients representing a power spectrum of the received audio. For example, with reference to FIG. 2, Mel frequency cepstrum coefficients may be determined based on audio input 111 (e.g., via audio data 211) by taking a Fourier transform of audio input 111 and/or audio received via microphone 201, mapping to the Mel scale, determining logs of the powers at each Mel frequency, and determining the Mel frequency cepstrum coefficients based on a discrete cosine transform (DCT) of the logs of the powers.

With continued reference to FIG. 3, sampling coefficients 302 may be stacked or concatenated or combined or the like to generate feature vectors 212. As shown, in an embodiment, 11 instances of sampling coefficients 302 may be combined to generate each feature vector of feature vectors 212. Furthermore, prior to stacking, sampling coefficients 302 may be normalized or the like. For example, Mel frequency cepstrum coefficients may be processed by cepstral mean normalization or the like to generate sampling coefficients 302. As shown, in an embodiment, 11 instances of sampling coefficients 302 may be combined to generate each feature vector such that each feature vector is a 143 (e.g., 11×13) dimensional vector. However, any number of instances of sampling coefficients 302 may be combined or stacked to generate feature vectors 212. As shown, feature vector $FV_1$ may include sampling coefficients associated with times $t_0$-$t_{10}$. Furthermore, feature vector $FV_2$ may include sampling coefficients associated with times $t_1$-$t_{11}$, feature vector $FV_3$ may include sampling coefficients associated with times $t_2$-$t_{12}$, and so on such that adjacent feature vectors have overlap with respect to sampling coefficients 302 that are included therein.

As shown in FIGS. 2 and 3, feature vectors 212 may be provided to acoustic scoring module 203. Acoustic scoring module 203 may score feature vectors 212 based on acoustic model 208 as received via memory and provide any number of output scores 214 based on feature vectors 212. For example, output scores 214, which may be characterized as probability scores, for each of any number or audio units are generated via an acoustic scoring of feature vectors 212 using acoustic scoring module 203 such that output scores are generated based on audio input 111. Output scores 214 may be characterized as scores, probabilities, probability scores, scores of audio units, scores of sub-phonetic units, probability density function scores, or the like. For example, acoustic scoring module 203 may generate such output scores or states for each of feature vectors 212 to generate a time series of scores 214 (e.g., represented as scores $S_1, S_2, \ldots$ in FIG. 3). For example, scores 214 may be a time series of scores of audio units such that each of scores 214 includes multiple scores, for a particular time instance, that are output from acoustic scoring module 203. At each time instance, the scores correspond to the likelihood that an audio unit is represented by one of feature vectors 212.

In an embodiment, acoustic scoring module 203 receives and implements acoustic model 208 as discussed herein. In an embodiment, acoustic model 208 may be a deep neural network (DNN) pretrained based on a training set of audio. In an embodiment, acoustic model 208 may be a deep neural network having any number of outputs such as 4,000 outputs or the like. In another embodiment, acoustic model 208 is a pruned deep neural network having the number of outputs reduced or pruned such that only a subset of available outputs (e.g., as determined during set-up and/or training) are provided or activated. Such required outputs may be provided by a states signal that request the required outputs or such required outputs may be preset or pretrained prior to implementation.

For example, the outputs of acoustic scoring module 203 (e.g., scores 214) may represent audio units corresponding to silence, non-spoken noise, spoken noise, or speech, as discussed further herein. In an embodiment, speech audio units are representative of sub-phonetic units such as tied context-dependent triphone states. Such tied context-dependent triphone states may represent monophones tied to monophones on either side (e.g., left and right) to generate tied context-dependent triphones. A language, for example, may have a number of monophones (e.g., 30-50 monophones) and sub-phonetic units such as exemplary tied context-dependent triphone states may include each of such monophones in a variety of contexts such that various other monophones are before and after such monophones to generate many combinations (e.g., the sub-phonetic units). Acoustic scoring module 203 may, based on feature vectors 212, provide probabilities or scores or the like associated with such sub-phonetic units (e.g., probabilities or scores as to which unit or phone has been spoken) as well as probabilities or scores associated with silence, non-spoken noise (e.g., background noise), spoken noise, etc. at its outputs. As shown in FIG. 3 and as discussed further herein, for each or some of scores 214, speech or non-speech decoder 204 may generate a corresponding speech indicator 215 (e.g., represented as speech indicators $SI_1, SI_2, \ldots$). In the example of FIG. 3, a speech indicator 215 is generated at each time instance as associated with scores 214. In other examples, a speech indicator 215 may be generated at less frequent time intervals or only when speech is detected. As discussed further herein, in generating speech indicator 215, speech or non-speech decoder 204 may implement speech pattern model 205.

Figure 4:
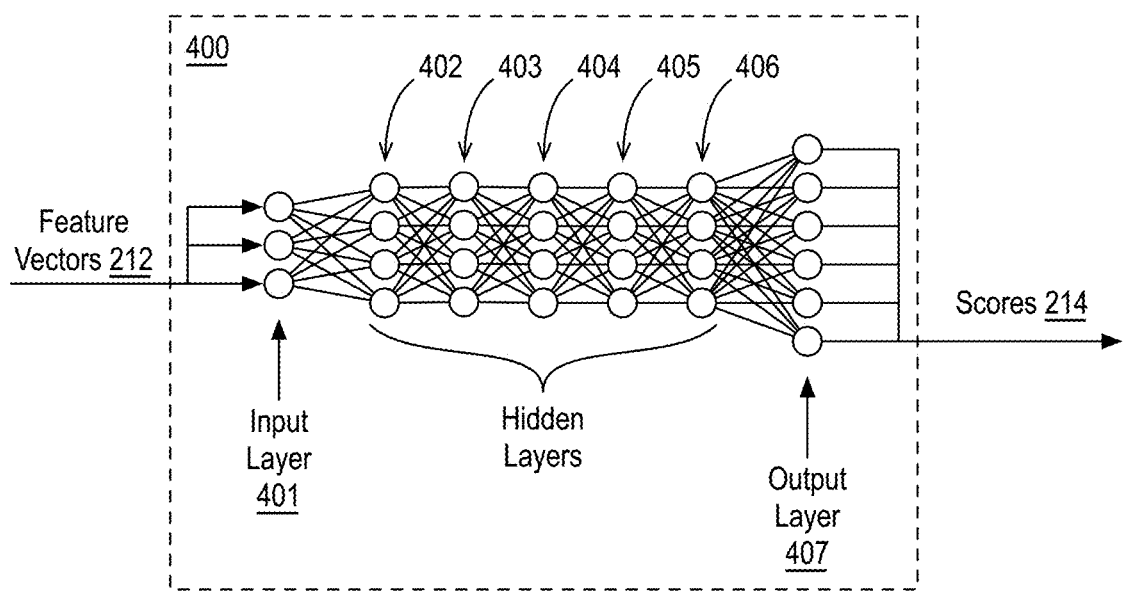
FIG. 4 illustrates an example acoustic model neural network.

FIG. 4 illustrates an example acoustic model neural network 400, arranged in accordance with at least some implementations of the present disclosure. For example, neural network 400 may be implemented as acoustic scoring module 203 in some embodiments. Neural network 400 may include any suitable neural network such as an artificial neural network, a deep neural network, a convolutional neural network, or the like. As shown in FIG. 4, neural network 400 may include an input layer 401, hidden layers 402-406, and an output layer 407. Neural network 400 is illustrated as having three input nodes, hidden layers with four nodes each, and six output nodes for the sake of clarity of presentation, however, neural network 400 may include any such input, hidden, and output nodes. Input layer 401 may include any suitable number of nodes such as a number of nodes equal to the number of elements in each of feature vectors 212. For example, input layer 401 may have 143 nodes corresponding to each of the 143 dimensions of feature vectors 212. In other examples, feature vectors may have fewer or more elements or dimensions and input layer 401 may have a corresponding number of nodes.

Furthermore, as in the illustrated example, neural network 400 may include five hidden layers 402-406. However, neural network 400 may include any number of hidden layers. Hidden layers 402-406 may include any number of nodes. For example, hidden layers 402-406 may include 1,500 to 2,000 nodes, 2,000 to 2,500 nodes, or the like. In some examples, hidden layers 402-406 have the same number of nodes and, in other examples, one or more layers may have different numbers of nodes. Output layer 407 may include any suitable number of nodes such that scores 214 include values corresponding to tied context-dependent triphone states or the like. In some examples, neural network 400 may implement Hidden Markov Models (HMMs). As discussed further herein, in some embodiments, output layer 407 may be pruned such that only predetermined output nodes (and associated scores 214) are provided such that a subset of available states or scores are implemented via neural network 400.

Figure 5:
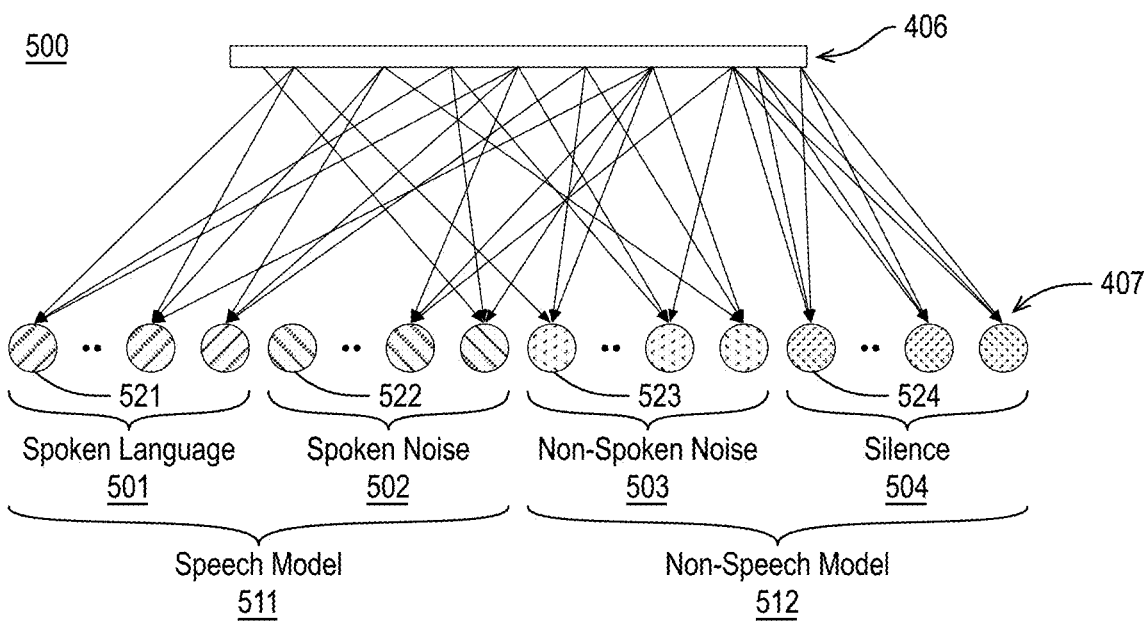
FIG. 5 illustrates an example data structure indicating audio units corresponding to an example neural network output layer.

FIG. 5 illustrates an example data structure 500 indicating audio units corresponding to an example neural network output layer 407, arranged in accordance with at least some implementations of the present disclosure. As shown in FIG. 5, output layer 407 may include any number of output nodes 521, 522, 523, 524 (only one of each of which is labeled for the sake of clarity). Output nodes 521 correspond to audio units that are categorized as or representative of spoken language audio units 501. Output nodes 522 correspond to audio units that are categorized as or representative of spoken noise audio units 502. Output nodes 523 correspond to audio units that are categorized as or representative of non-spoken noise audio units 503. Output nodes 524 correspond to audio units that are categorized as or representative of silence audio units 504.

For example, output nodes 521 that correspond to spoken language audio units 501 provide probability scores for spoken language audio units 501. Each of output nodes 521 model or represent different spoken language audio units 501 but they are common in that they all model or represent spoken language audio units 501. For example, spoken language audio units 501 include those audio units that correspond to spoken language such as sub-phonetic units including tied context-dependent triphone states representative of units of human speech as discussed herein. Similarly, output nodes 522 corresponding to spoken noise audio units 502 provide probability scores for spoken noise audio units 502 such that each models or represents different spoken noise audio units 502 but all model or represent spoken noise audio units 502. For example, spoken noise audio units 502 include audio units that are recognized as spoken by a human but are not recognized as spoken language.

As shown, spoken language audio units 501 and spoken noise audio units 502 (and their corresponding output nodes 521, 522, respectively) are grouped together as a speech model 511. For example, output nodes 521, 522 correspond to speech model 511 and are inclusive of output nodes 521 corresponding to spoken language audio units 501 and output nodes 521 corresponding to spoken noise audio units 502. By grouping output nodes 521, 522 into speech model 511, speech model 511 is representative of the portion (e.g., subset of output nodes) of output layer 407 that corresponds to and provides probability scores related to human speech.

Similarly, output nodes 523 that correspond to non-spoken noise audio units 503 provide probability scores for non-spoken noise audio units 503. Each of output nodes 523 model or represent different non-spoken noise audio units 503 with the commonality that they all model or represent non-spoken noise audio units 503. For example, non-spoken noise audio units 503 include those audio units that correspond to non-spoken noise such as background noise in various environments (e.g., outdoors, in a car or other transportation vehicle, in a cafeteria or other populated space, etc.). Output nodes 524 corresponding to silence audio units 504 provide probability scores for silence audio units 504 such that each models or represents different silences but all model or represent silence audio units 504. For example, silence audio units 504 include audio units that are recognized as silence (e.g., a quiet environment, a break in speech or noise, etc.).

Non-spoken noise audio units 503 and silence audio units 504 (and their corresponding output nodes 523, 524, respectively) are grouped together as a non-speech model 512. 501 and output nodes 521 corresponding to spoken noise audio units 502. By grouping output nodes 521, 522 into speech model 511, speech model 511 is representative of the portion (e.g., subset of output nodes) of output layer 407 that corresponds to and provides probability scores related to human speech.

Returning to FIG. 2, as discussed, scores 214 from acoustic scoring module 203 may be provided to speech or non-speech decoder 204. Also, as shown, speech or non-speech decoder 204 may also receive and implement speech pattern model 205. For example, speech or non-speech decoder 204 may receive speech pattern model 205 from memory. For example, speech or non-speech decoder 204 may receive and implement any speech pattern model discussed herein. Using scores 214 and through implementation of speech pattern model 205, speech or non-speech decoder 204 updates speech pattern model 205 based on some or all of scores at any number of time instances. As discussed further herein, speech pattern model 205 includes a number of states including a first non-speech state followed by any number of speech states, which are then followed by another non-speech state. At each or some time instances, each state of speech pattern model 205 is updated to generate a score for each state. Such state scores are then evaluated to determine, at that time instance, one or more of whether audio input 111 includes speech, whether a speech begin point has been detected, and whether a speech end point has been detected, as discussed further herein.

Figure 6:
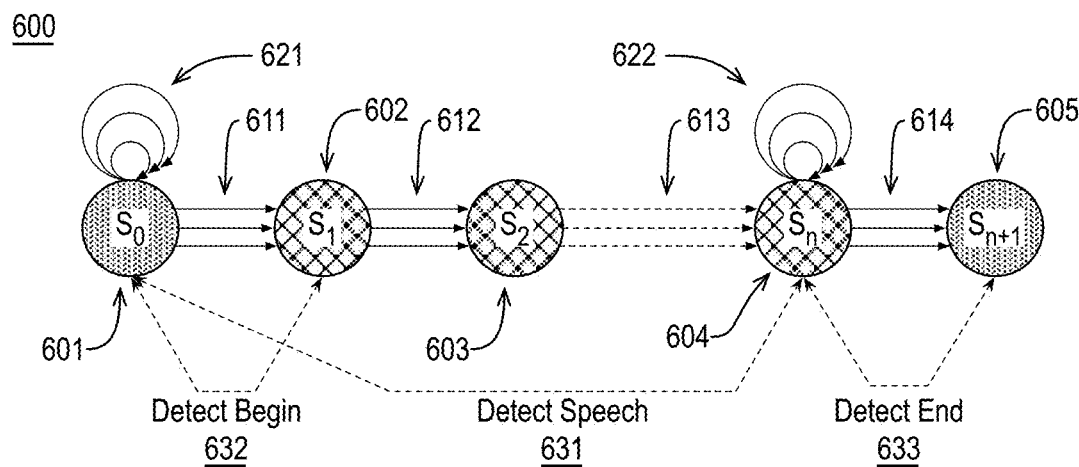
FIG. 6 illustrates an example speech pattern model.

FIG. 6 illustrates an example speech pattern model 600, arranged in accordance with at least some implementations of the present disclosure. For example, speech pattern model 600 may be implemented as speech pattern model 205. For example, speech pattern model 600 provides a chain of states related to a speech signal pattern. Speech pattern model 600 may be characterized as a speech model, a speech signal model, or the like. As shown in FIG. 6, speech pattern model 600 includes a non-speech state 601, any number of speech states 602, 603, 604, and a non-speech state 605. In FIG. 6, speech states are illustrated with cross hatching and non-speech states are illustrated with a dotted pattern. Furthermore, each speech state of speech pattern model 600 has a corresponding score, labeled as $S_0$, $S_1$, $S_2$, $S_n$, $S_{n+1}$ such that score $S_0$ corresponds to non-speech state 601, score $S_1$ corresponds to speech state 602, score $S_2$ corresponds to speech state 603, score $S_n$ corresponds to speech state 604, and score $S_{n+1}$ corresponds to non-speech state 605. Furthermore, any number of scores $S_3$-$S_{n-1}$ correspond to speech states between speech states 603, 604. Also as shown, non-speech state 601 includes or has corresponding thereto multiple self loops 621. Furthermore, speech state 604 includes or has corresponding thereto multiple self loops 622.

For example, non-speech state 601 may correspond to a start state of speech pattern model 600. Each of self loops 621 are associated with one of scores 214 (e.g., an output from acoustic scoring module 203) such that self loops 621 provide self updates or summing or the like for non-speech state 601. In an embodiment, each of self loops 621 are associated with one of output nodes 523 or output nodes 524 such that self loops 621 implement non-speech model 512. In some embodiments, during each update (e.g., at a time instance, t) of speech pattern model 600, score $S_0$ of non-speech state 601 is the sum of the prior score (e.g., at time instance, t−1) of $S_0$ and the maximum value corresponding to self loops 621 (e.g., the maximum probability score of output nodes 523 and output nodes 524). Using such techniques, non-speech state 601 provides a continual summing of probabilities of non-speech. For example, non-speech state 601 (e.g., a first state of speech pattern model 600) models a non-speech signal that is expected before speech occurs. Self loops 621 model an arbitrary amount of non-speech data or signal that may be detected before a speech signal.

For example, each of self loops 621 may be associated with a deep neural network output or output node that corresponds to a non-spoken noise audio unit 503 or a silence audio unit 504. Using the discussed scoring techniques, non-speech state 601 may provide a start state that implements a non-speech detector. Self loops 621 may include any number of self loops. For example, at each time instance of outputs from acoustic scoring module 203, non-speech state 601 may be updated to provide a non-speech likelihood score associated therewith. For example, self loops 621 provide updates to non-speech state 601 at each time instance of outputs (e.g., scores 214) from acoustic scoring module 203.

Also as shown in FIG. 6, speech pattern model 600 includes any number of speech states 602, 603 604 subsequent to non-speech state 601. Speech state 602 is connected to non-speech state 601 by transitions 611, speech state 603 is connected to speech state 602 by transitions 612, and any number of speech states through speech state 604 may be connected to previous speech states by transitions 613. Each of speech states 602, 603, 604 are updated at each update of speech pattern model 600. In some embodiments, during each update (e.g., at a time instance, t), each of speech states 602, 603, 604 of speech pattern model 600, are updated as follows. Score $S_1$ at time instance, t, is a sum of score $S_0$ of non-speech state 601 at a previous time instance, t−1, and a maximum value corresponding to transitions 611. Each of transitions 611 are associated with one of scores 214 (e.g., an output from acoustic scoring module 203) such that transitions 611 provide updates or summing or the like for speech states 602, 603, 604. In an embodiment, each of transitions 611 are associated with one of output nodes 521 and output nodes 522 such that transitions 611 implement speech model 511. That is, during updates, speech states 602, 603, 604 are updated based on (e.g., as a sum of) the value of a prior state in speech pattern model 600 at a prior time instance and a maximum probability score of a probability of speech.

Scores $S_2$ and $S_n$ (and any other speech state scores) may be generated in a similar manner. For example, Score $S_2$ at time instance, t, is a sum of score $S_1$ of speech state 602 at a previous time instance, t−1, and a maximum value corresponding to transitions 612. Transitions, similar to transitions 611 are associated with one of scores 214 (e.g., an output from acoustic scoring module 203) and also are representative of speech probability scores. In an embodiment, transitions 612, 613 correspond to the same output nodes (e.g., output nodes 521, 522) as transitions 611. In some embodiments, they may differ such that not all output nodes match for all of transitions 611, 612, 613. Similarly, Score $S_{n-1}$ of a speech state (not shown) at time instance, t, is a sum of score $S_{n-2}$ of a speech state (not shown) at a previous time instance, t−1, and a maximum value corresponding to transitions 613. Notably, speech state 602 is updated using a non-speech state 601 (e.g., a value from a non-speech state at a prior time instance summed with a maximum speech probability score from one of output nodes 523, 524) while all other speech states 603, 604 are updated using a previous speech state.

Furthermore, speech state 604 includes optional self loops 622. Each of self loops 622 are associated with one of scores 214 (e.g., an output from acoustic scoring module 203) such that self loops 622 provide a continual self updating or summing for speech state 604 (e.g., a final speech state). In an embodiment, each of self loops 622 are associated with one of output nodes 521 and output nodes 522 such that self loops 622 implement speech model 512. In some embodiments, self loops 622 correspond to the same probability scores (e.g., output nodes) as those of transitions 611, 612, 613. In some embodiments, during each update (e.g., at a time instance, t) of speech pattern model 600, score $S_n$ of speech state 604 is the maximum of (1) a sum of the prior score (e.g., at time instance, t−1) of $S_n$ and the maximum value corresponding to self loops 622 (e.g., the maximum probability score of output nodes 521 and output nodes 522) or (2) a sum of the prior score (e.g., at time instance, t−1) of $S_{n-1}$ and the maximum value corresponding to transitions 613 (e.g., the maximum probability score of output nodes 521 and output nodes 522). In some embodiments, the values of self loops 622 and transitions 613 are the same and the updated score $S_n$ of speech state 604 may be simplified to be the maximum of the prior score (e.g., at time instance, t−1) of $S_n$ or $S_{n-1}$ and the maximum of self loops 622 (or transitions 613). For example, speech states 602, 603, 604 may provide for the modeling of a minimum of required speech duration related to scores propagation from $S_1$ to $S_n$ with speech state 604 having self loops 622 associated with output nodes 521, 522 related to speech. For example, self loops 622 provided with respect to speech state 604 provide for a final speech score for evaluation (as discussed below) to continue to increase as a speech segment continues beyond the time limit defined by the number of speech states 602, 603, 604 (e.g., the chain length of the speech states).

Speech pattern model 600 also includes a non-speech state 605 subsequent speech states 602, 603 604 (e.g., immediately following speech state 604). Non-speech state 605 is connected to speech state 604 by transitions 614. Non-speech state 605 is updated at each update of speech pattern model 600. In some embodiments, during each update (e.g., at a time instance, t), non-speech state 605 of speech pattern model 600, is updated such that score $S_{n+1}$ at time instance, t, is a sum of score $S_n$ of speech state 604 at a previous time instance, t−1, and a maximum value corresponding to transitions 614. Each of transitions 614 are associated with one of scores 214 (e.g., an output from acoustic scoring module 203) such that transitions 614 provide updates or summing or the like for non-speech state 605. In an embodiment, each of transitions 614 are associated with one of output nodes 523 and output nodes 524 such that transitions 614 implement non-speech model 512. That is, in some embodiments, during updates, non-speech state 605 is updated based on (e.g., as a sum of) the value of a prior state in speech pattern model 600 at a prior time instance and a maximum probability score of a probability of non-speech. In such embodiments, transitions 614 may match self loops 621. In an embodiment, transitions 614 implement a non-speech model corresponding to silence audio units 504 and non-spoken noise units 503 such that transitions 614 correspond to output nodes 524 and output nodes 523. For example, non-speech state 605 (e.g., the final state of speech pattern model 600) may relate to a non-speech signal expected at the end of a speech segment.

With reference to FIG. 2, using the discussed techniques, each state of speech pattern model 600 is updated over time (e.g., across time instances) for each iteration of scores 214, which correspond to iterations of feature vectors 212, which, in turn, correspond to time segments of audio data 211. Furthermore, speech or non-speech decoder 204, after updating speech pattern model 205 such as speech pattern model 600, may use the updated speech pattern model to determine speech indicator(s) 215.

Returning to FIG. 6, in an embodiment, to detect speech, speech or non-speech decoder 204 compares score $S_n$ of speech state 604 (e.g., a final speech state of speech pattern model 600) to score $S_0$ of non-speech state 601 (e.g., a first non-speech state of speech pattern model 600) as indicated by detect speech operation 631. In an embodiment, speech or non-speech decoder 204 compares the difference between the score of speech state 604 and the score of speech state 602 (e.g., $S_n$-$S_0$) and compares the difference to a threshold (e.g., TH). When the difference between the score of speech state 604 and the score of speech state 602 compares favorably to the threshold (e.g., exceeds, is equal to or greater then, etc.) then speech is detected and an indicator indicative of detected speech is provided via speech indicator(s) 215. In an embodiment, a ratio of the score of speech state 604 and the score of speech state 602 is compared to a threshold and, if the ratio compares favorably to the threshold, speech is detected. In another embodiment, to detect speech, speech or non-speech decoder 204 compares score $S_n$ of speech state 604 (e.g., a final speech state of speech pattern model 600) to score $S_1$ of speech state 602 (e.g., a first speech state of speech pattern model 600).

In an embodiment, to detect an end of speech, speech or non-speech decoder 204 compares score $S_n$ of speech state 604 (e.g., a final speech state of speech pattern model 600) to score $S_{n+1}$ of non-speech state 605 (e.g., a final state of speech pattern model 600) as indicated by detect end of speech operation 633. In an embodiment, speech or non-speech decoder 204 indicates an end of speech when score $S_{n+1}$ of non-speech state 605 exceeds score $S_n$ of speech state 604. In an embodiment, speech or non-speech decoder 204 indicates an end of speech when score $S_{n+1}$ of non-speech state 605 exceeds score $S_n$ of speech state 604 for three out of five score updates (e.g., the three need not be consecutive) or any similar majority of score updates. For example, detect end of speech operation 631 may include determining a score $S_{n+1}$ of non-speech state 605 exceeds a score $S_n$ of speech state 604 for a majority of multiple consecutive speech model pattern updates.

Furthermore, in some embodiments, to detect a beginning of speech, speech or non-speech decoder 204 compares score $S_1$ of speech state 602 (e.g., a first speech state of speech pattern model 600) to score $S_0$ of non-speech state 601 (e.g., a first state of speech pattern model 600) as indicated by detect begin of speech operation 632. In an embodiment, speech or non-speech decoder 204 indicates a begin of speech when score $S_1$ of speech state 602 exceeds score $S_0$ of non-speech state 604. In an embodiment, speech or non-speech decoder 204 indicates a begin of speech when score $S_1$ of speech state 602 exceeds score $S_0$ of non-speech state 604 three out of five score updates (e.g., the three need not be consecutive) or any similar majority of score updates. For example, detect begin of speech operation 632 may include determining a score $S_1$ of speech state 602 exceeds a score $S_0$ of non-speech state 601 for a majority of multiple consecutive speech model pattern updates.

As will be appreciated, begin of speech operation 632, detect end of speech operation 633, and detect speech operation 631 may be used in conjunction for a speech signal. For example, begin of speech operation 632 may detect a candidate begin of speech signal as discussed at a particular update of speech pattern model 600. The time instance, time stamp, audio frame time, audio frame index, or the like may be saved for the candidate begin of speech. Later, after subsequent updates to speech pattern model 600, speech may be detected as discussed with respect to detect speech operation 631 and the candidate begin of speech may be confirmed as being within a particular time threshold of the candidate begin of speech. Alternatively, no speech may ever be detected or the speech may be detected after the time threshold such that the candidate begin of speech is not confirmed but is instead discarded. Assuming the candidate begin of speech is confirmed, an end of speech may then be detected as discussed with respect to detect end of speech operation 633. The time instance, time stamp, audio frame time, audio frame index, or the like of the end of speech may be saved and correlated with the now verified begin of speech. With reference to FIG. 2, in an embodiment, the begin of speech and end of speech time instances, time stamps, audio frame times, audio frame indices, etc. are provided via speech indicator(s) 215 such that controller 206 or another module or component of system 200 may operate in accordance with the begin and end times. For example, speech signal processing, automatic speech recognition, key phrase detection, or other operations may be performed only on the portion of audio data 211 corresponding to the speech signal defined by the begin of speech and end of speech.

In the illustrated embodiment, speech pattern model 600 includes a single non-speech state 601 before any number of speech states 602, 603, 604, which are followed by a single non-speech state 605. Speech states 602, 603, 604 may include any number of speech states such as 50, 100, or more speech states. For example, the number of speech states 602, 603, 604 may be varied such that the modification of speech states chain length (and the detection threshold applied to speech states 601, 604 as discussed with respect to detect speech operation 631) allows adjustment of the sensitivity of speech/non-speech classification made by speech pattern model 600. In an embodiment, the greater the detection threshold and the greater the number of speech states 602, 603, 604, the less sensitive the classification is to speech (e.g., providing fewer false positives) while a lower detection threshold and fewer number of speech states 602, 603, 604, the more sensitive the classification is to speech (e.g., providing fewer false negatives). For example, a threshold parameter with an appropriate value provides for noise to be ignored that could otherwise be mistaken with speech.

Furthermore, as discussed, the detection sensitivity of speech pattern model 600 may be modified based on the speech states sequence length of speech states 602, 603, 604 (e.g., for scores $S_1$-$S_n$). For example, more speech states 602, 603, 604 require a longer speech signal (e.g., longer time duration) to be detected to qualify as a speech segment. In other embodiments, the number of non-speech states after speech states 602, 603, 604 may be adjusted.

Figure 7:
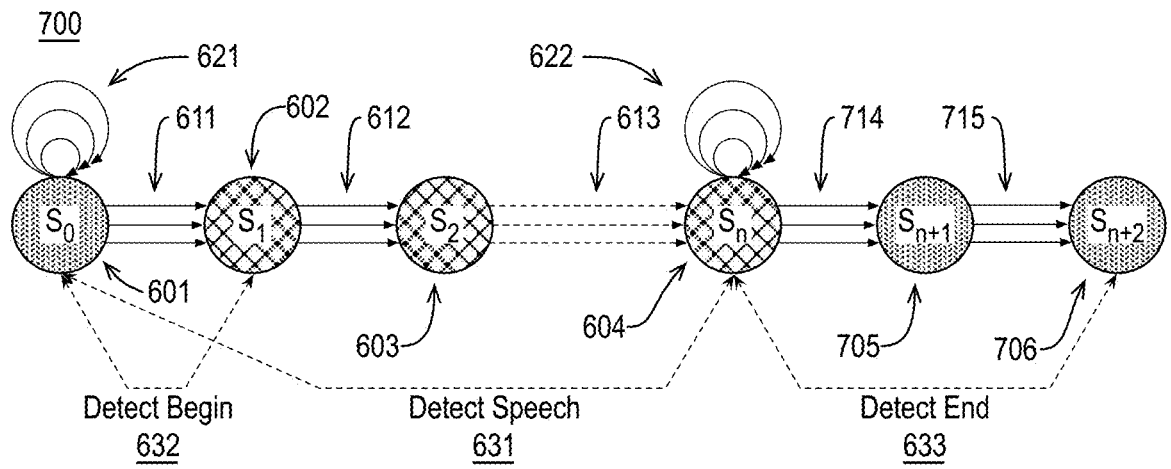
FIG. 7 illustrates another example speech pattern model.

FIG. 7 illustrates another example speech pattern model 700, arranged in accordance with at least some implementations of the present disclosure. For example, speech pattern model 700 may be implemented as speech pattern model 205 and speech pattern model 700 provides a chain of states related to a speech signal pattern. As with speech pattern model 600, speech pattern model 700 may be characterized as a speech model, a speech signal model, or the like. As shown in FIG. 7, speech pattern model 600 includes non-speech state 601, any number of speech states 602, 603, 604, and non-speech states 705, 706. Speech states are illustrated with cross hatching and non-speech states are illustrated with a dotted pattern. Furthermore, each speech state of speech pattern model 600 has a corresponding score, labeled as $S_0$, $S_1$, $S_2$, $S_n$, $S_{n+1}$, $S_{n+2}$ such that score $S_0$ corresponds to non-speech state 601, score $S_1$ corresponds to speech state 602, score $S_2$ corresponds to speech state 603, score $S_n$ corresponds to speech state 604, score $S_{n+1}$ corresponds to non-speech state 705, and score $S_{n+2}$ corresponds to non-speech state 706. Also as shown, non-speech state 601 includes or has corresponding thereto multiple self loops 621 and speech state 604 includes or has corresponding thereto multiple self loops 622.

In FIG. 7, like numerals with respect to FIG. 6 indicate like components. In particular, at updates of speech pattern model 700, non-speech state 601 and speech states 602, 603, 604 may be updated as discussed with respect to speech pattern model 600. Notably, speech pattern model 700 includes multiple non-speech states 705, 706 after final speech state 604. For example, multiple non-speech states 705, 706 (e.g., two, as in the illustrated embodiment, or more) provide for silence during a speech segment to be ignored with respect to detecting speech. That is, speech may still be detected even if a silence or non-speech noise occurs during the speech signal.

In particular, non-speech state 705 is connected to speech state 604 by transitions 714. Non-speech state 705 is updated at each update of speech pattern model 700 such that, during each update (e.g., at a time instance, t), non-speech state 705 of speech pattern model 700 is updated to a score $S_{n+1}$ at time instance, t, that is a sum of score $S_n$ of speech state 604 at a previous time instance, t−1, and a maximum value corresponding to transitions 714. Each of transitions 714 are associated with one of scores 214 (e.g., an output from acoustic scoring module 203) such that transitions 714 provide updates or summing or the like for non-speech state 705. In an embodiment, each of transitions 714 are associated with one of output nodes 523 and output nodes 524 such that transitions 714 implement non-speech model 512. That is, in some embodiments, during updates, non-speech state 705 is updated based on (e.g., as a sum of) the value of a prior state in speech pattern model 700 at a prior time instance and a maximum probability score of a probability of non-speech. For example, transitions 714 may match self loops 621.

Non-speech state 706 is connected to non-speech state 705 by transitions 715. Non-speech state 706 is updated at each update of speech pattern model 700 such that, during each update (e.g., at a time instance, t), non-speech state 706 is updated to a score $S_{n+2}$ at time instance, t, that is a sum of score $S_{n+1}$ of non-speech state 705 at a previous time instance, t−1, and a maximum value corresponding to transitions 715. Each of transitions 715 are associated with one of scores 214 (e.g., an output from acoustic scoring module 203) such that transitions 715 provide updates or summing or the like for non-speech state 706. In an embodiment, each of transitions 715 are associated with one of output nodes 523 and output nodes 524 such that transitions 715 implement non-speech model 512. That is, in some embodiments, during updates, non-speech state 706 is updated based on (e.g., as a sum of) the value of a prior state in speech pattern model 700 at a prior time instance and a maximum probability score of a probability of non-speech. In an embodiment, transitions 715 match transitions 714 and self loops 621.

As discussed with respect to FIG. 6, speech pattern model 700, after updating may be evaluated for begin of speech detection by detect begin of speech operation 632, for speech detection by detect speech operation 631, and for end of speech by detect end of speech operation 633. Such operations may be performed in the same manner on speech pattern model 700.

Figure 8:
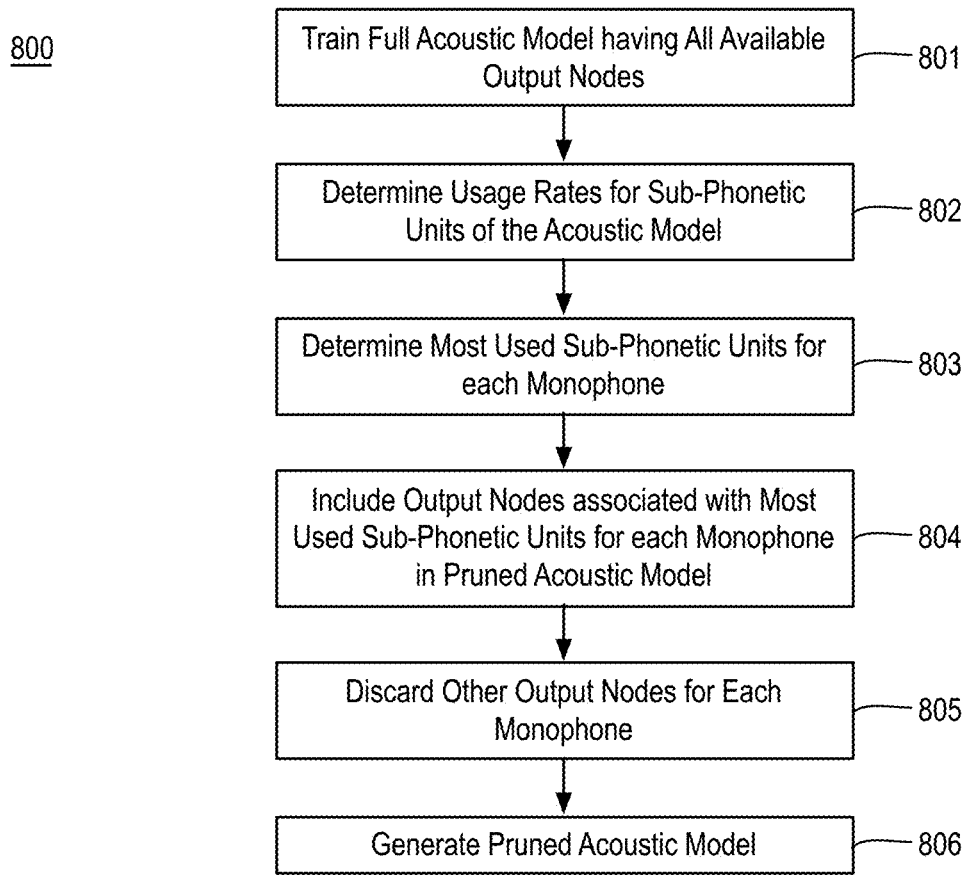
FIG. 8 illustrates an example process for generating an acoustic model for speech or non-speech detection.

FIG. 8 illustrates an example process 800 for generating an acoustic model for speech or non-speech detection, arranged in accordance with at least some implementations of the present disclosure. Process 800 may include one or more operations 801-806 as illustrated in FIG. 8. Process 800 or portions thereof may be performed by a device or system to generate an acoustic model for speech or non-speech detection.

Process 800 begins at operation 801, where an acoustic model is trained. The acoustic model may include any suitable acoustic model such as an artificial neural network, a deep neural network, a convolutional neural network, or the like as discussed herein. For example, at operation 801, a full neural network or model (e.g., having a full set of available output nodes) is trained based on a predetermined training set of audio input. As discussed herein, the full set of available output nodes may include nodes corresponding to audio units of different types such as spoken language audio units, spoken noise audio units, non-spoken noise audio units, and silence audio units. In particular, the full set of available output nodes may include output nodes corresponding spoken language (e.g., spoken language audio units and, optionally, spoken noise audio units), which provide scores of sub-phonetic units such as tied triphone HMM-states as discussed herein.

Figure 9:
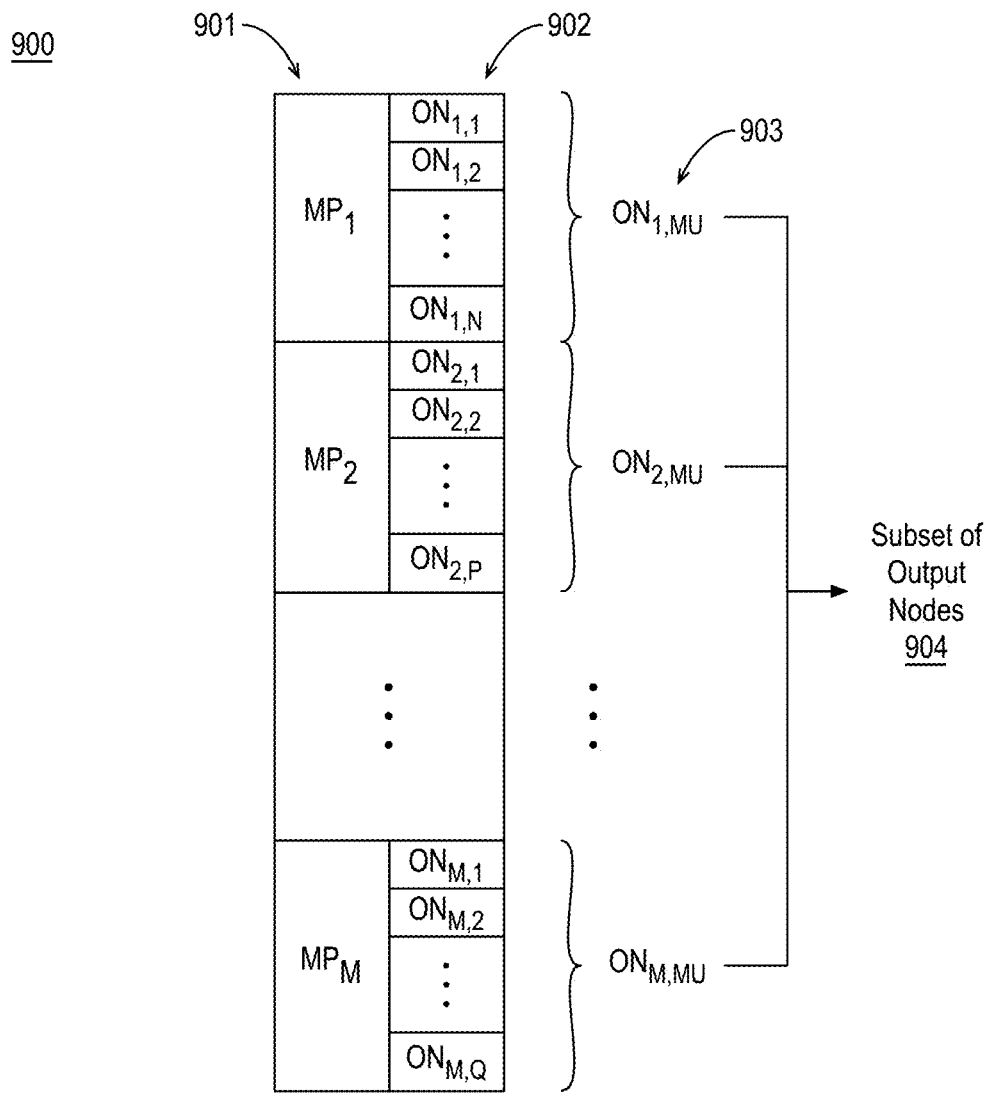
FIG. 9 illustrates example data structures associated with pruning an acoustic model for speech or non-speech detection.

FIG. 9 illustrates example data structures 900 associated with pruning an acoustic model for speech or non-speech detection, arranged in accordance with at least some implementations of the present disclosure. As shown in FIG. 9, a lexicon or the like may include multiple monophones 901 associated therewith (e.g., labeled $MP_1$, $MP_2$, . . . , $MP_M$). The pronunciation of a word or phrase in a language or lexicon may be represented as a series of individual units of sound, which may be characterized as phones. A monophone may be characterized as a single phone. Such a monophone may, in speech, correspond to a particular sound made by a user. A lexicon or language or the like may include any number of monophones 901. For each monophone, multiple output nodes 902 of a full acoustic model may be generated.

For example, each sub-phonetic unit or tied triphone HMM-state of a lexicon or language may correspond to an output node of a full acoustic model. For example, tied triphone HMM-states may have a monophone with tied monophones on either side thereof. For example, output nodes $ON_{1,1}$-$ON_{1,N}$ may correspond to monophone $MP_1$ such that each of output nodes $ON_{1,1}$-$ON_{1,N}$ corresponds to a triphone HMM-state having monophone $MP_1$ at its center, tied output nodes $ON_{2,1}$-$ON_{2,P}$ may correspond to monophone $MP_2$ such that each of output nodes $ON_{2,1}$-$ON_{2,P}$ corresponds to a triphone HMM-state having monophone $MP_2$ at its center, and so on such that output nodes $ON_{M,1}$-$ON_{M,Q}$ may correspond to monophone $MP_M$ such that each of output nodes $ON_{M,1}$-$ON_{M,Q}$ corresponds to a triphone HMM-state having monophone $MP_M$ at its center. For example, each of output nodes 902 may be associated with a particular monophone of monophones 901. As shown, each monophone of monophones 901 may include any number of associated output states of output nodes 902. In some examples that implement tied triphone HMM-states, there may be an overlap in the sub-phonetic units/output nodes. For example, $ON_{1,2}$ might also be used in some sub-phonetic unit of $MP_2$ and so on. For example, the structure may be provided as follows: Monophone→triphone→sub-phonetic units/ON. For example, the triphone a/b/a and the triphone e/t/a may each have 3 sub-phonetic units. However, the second/a/ in both triphones might share the same sub-phonetic unit. Furthermore, the acoustic model being trained based on process 800 and may include an output node for each of output nodes 902 as well as output nodes associated with silence, noise, etc. as discussed herein. Notably, process 800 may prune speech nodes.

Returning to FIG. 8, processing continues at operation 802, where usage rates may be determined for output nodes of the acoustic model corresponding to context-dependent triphone HMM-states during training of the full acoustic model. In some embodiments, during training, when an output node of the acoustic model is used or has a non-zero output or the like, a usage rate associated with the output node may be incremented. Such tracking of usage rates may be performed during the entirety of training or portions thereof. Such tracking provides indications of the amount each output node is used during training. As discussed, in some embodiments, at each non-zero output of a node, the usage rate of a node is incremented (e.g., by one for each non-zero usage). In an embodiment, at each non-zero output, the usage rate of a node is increased by the non-zero output value itself.

Processing continues at operation 803, where a subset of the available output nodes is determined such that the subset includes the highest use output node associated with each monophone. For example, with reference to FIG. 9, for each monophone of monophones 901, a highest usage rate output node may be determined to generate highest usage rate output nodes 903. In an embodiment, highest usage rate output node $ON_{1,MU}$ may correspond to monophone $M_1$, highest usage rate output node $ON_{2,MU}$ may correspond to monophone $M_2$, and so on. Such highest usage rate output nodes 903 may be included in subset of output nodes 904 for use in an acoustic model and, correspondingly, in a speech pattern model. For example, each of subset of output nodes 904 may be representative of speech and such subset of output nodes 904 may be used as output nodes 521 corresponding to spoken language audio units 501, which, as discussed, are included in transitions 611, 612, 613 and self loops 622. In the illustrated example, the highest usage rate output nodes 903 includes a single highest usage node for each monophone. However, any number of highest usage rate output nodes may be used for each monophone such as two or three. The number of output nodes for each monophone may be the same or they may be different. For example, a threshold may be applied to determine the number of output nodes for each monophone such that all output nodes having a usage rate greater than a threshold may be used for each monophone.

Returning to FIG. 8, processing continues at operation 804, where the subset of output nodes determined at operation 803 are included in a pruned acoustic model (and a speech pattern model), and at operation 805, where other output nodes (e.g., those not in the subset) are discarded and not included in the pruned acoustic model, and operation 806, where a pruned acoustic model is generated that includes the subset of output nodes determined at operation 803 while the remainder are discarded. For example, the pruned acoustic model may be implemented as acoustic model 208, acoustic model neural network 400, or any other acoustic model discussed herein.

Figure 10:
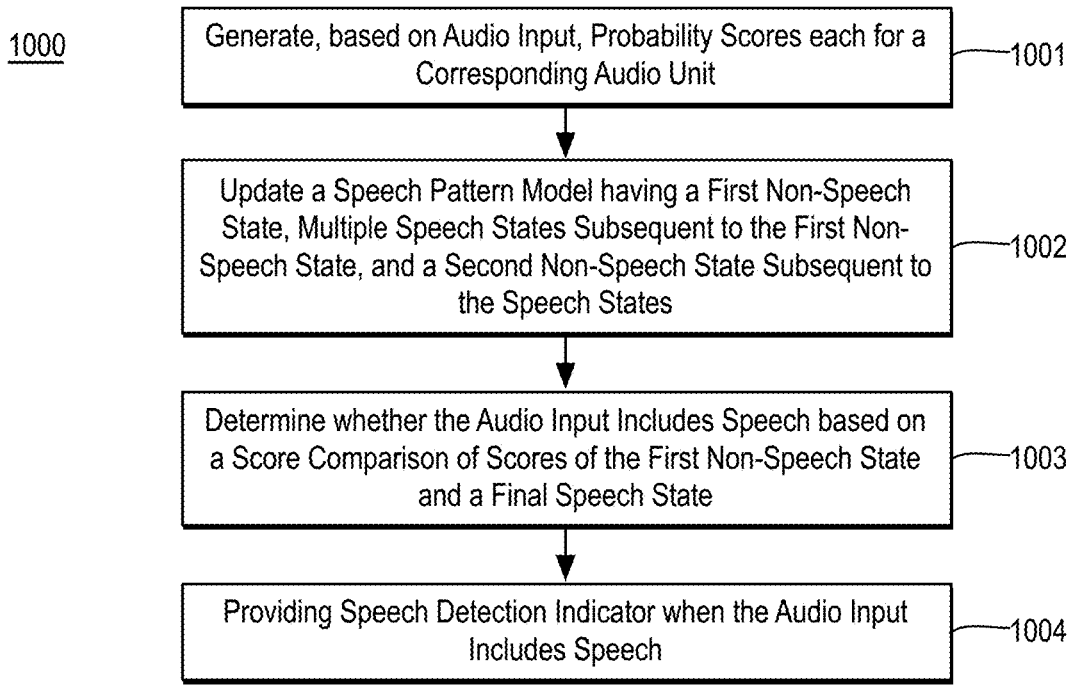
FIG. 10 is a flow diagram illustrating an example process for speech or non-speech detection.

FIG. 10 is a flow diagram illustrating an example process 1000 for speech or non-speech detection, arranged in accordance with at least some implementations of the present disclosure. Process 1000 may include one or more operations 1001-1004 as illustrated in FIG. 10. Process 1000 may form at least part of a speech or non-speech detection process performed, for example, by system 200. Furthermore, process 1000 will be described herein in reference to system 1100 of FIG. 11.

Figure 11:
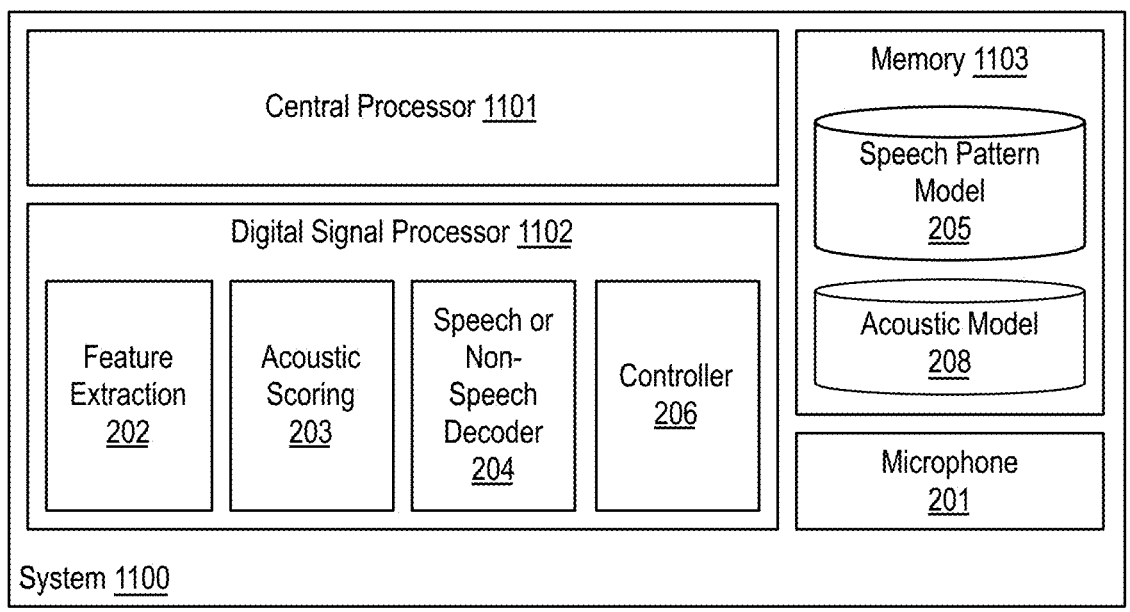
FIG. 11 is an illustrative diagram of an example system for performing speech or non-speech detection.

FIG. 11 is an illustrative diagram of an example system 1100 for performing speech or non-speech detection, arranged in accordance with at least some implementations of the present disclosure. As shown in FIG. 11, system 1100 may include a central processor 1101, a digital signal processor 1102, a memory 1103, and microphone 201. Also as shown, digital signal processor 1102 may include feature extraction module 202, acoustic scoring module 203, speech or non-speech decoder 204, and controller 206. In some embodiments, digital signal processor 1102 may also include voice activity detection module 207. Also as shown, memory 1103 may store speech pattern model 205 and acoustic model 208. Memory 1103 may also store audio data, input speech data, voice activity detection parameters or data, coefficient data, feature vectors, scores, output scores, speech pattern model state scores, thresholds, iteration data, state values or scores, or any other data or data structures as discussed herein.

Central processor 1101 and digital signal processor 1102 may include any number and type of processing units that may provide the operations as discussed herein. Such operations may be implemented via software or hardware or a combination thereof. For example, digital signal processor 1102 may include circuitry dedicated to manipulate data obtained from memory 1103 or dedicated memory. Furthermore, central processor 1101 may include any number and type of processing units or modules that may provide control and other high level functions for system 1100 as well as the operations as discussed herein. In the illustrated example, system 1100 may be configured to perform key phrase detection.

Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory. As shown, in an embodiment, feature extraction module 202, acoustic scoring module 203, speech or non-speech decoder 204, and controller 206 are implemented via digital signal processor 1102. In another embodiment, one more or all of feature extraction module 202, acoustic scoring module 203, speech or non-speech decoder 204, and controller 206 are implemented via central processor 1101. In other embodiments, all or some or digital signal processor 1102 may include feature extraction module 202, acoustic scoring module 203, speech or non-speech decoder 204, and controller 206 are implemented via an execution unit (EU). The EU may include, for example, programmable logic or circuitry such as a logic core or cores that may provide a wide array of programmable logic functions. In an embodiment, digital signal processor 1102 and memory 1103 may be provided or implemented as a system on a chip.

Returning to discussion of FIG. 10, process 1000 begins at operation 1001, where, via acoustic scoring of an acoustic model based on received audio input, multiple probability scores are generated each for a corresponding audio unit. The acoustic scoring may be performed using any suitable technique or techniques. In an embodiment, the acoustic model is a deep neural network and generating the multiple probability scores includes scoring a feature vector if a stack of a time series of coefficients each associated with a sampling time by the deep neural network.

In an embodiment, the acoustic model is a pruned acoustic model and process 1000 further includes training a full acoustic model including multiple output nodes each corresponding to one of noise, silence, or sub-phonetic units each associated with one of a plurality of monophones, determining a usage rate for each of the sub-phonetic units during the training, determining a selected output node corresponding to a highest usage rate sub-phonetic unit for each of the plurality of monophones, and including, in the acoustic model implemented at operation 1001, the selected output nodes corresponding to the highest usage rate sub-phonetic units and discarding remaining output nodes corresponding to the sub-phonetic units.

Processing continues at operation 1002, where a speech pattern model is updated based on at least some of the probability scores to generate a score for each state of the speech pattern model. For example, the speech pattern model may be updated at a series of time instances based on a series of scores from the acoustic model. In an embodiment, the speech pattern model includes a first non-speech state including multiple self loops each associated with a non-speech probability score of the probability scores generated at operation 1001, multiple speech states following the first non-speech state, and a second non-speech state following the speech states. In an embodiment, the second non-speech state is a non-speech state connected to the second speech state by multiple transitions each corresponding to a non-speech score of the multiple scores generated at operation 1001. In an embodiment, the second non-speech state is a silence state connected to the second speech state by multiple transitions each corresponding to a silence score of the multiple scores generated at operation 1001. In an embodiment, the speech pattern model includes a first non-speech state including a plurality of self loops each associated with a non-speech probability score of the probability scores, a plurality of speech states following the first non-speech state, and a second non-speech state following the speech states, such that the speech states comprise a first speech state following the first non-speech state and a second speech state following the first speech state and preceding the second non-speech state.

In an embodiment, the speech pattern model includes one or more third non-speech states immediately following the second speech state and immediately preceding the second non-speech state such that one of the third non-speech states is connected to the second non-speech state by multiple transitions each corresponding to the non-speech probability scores of the plurality of self loops. In an embodiment, the first speech state is connected to the first non-speech state by multiple first transitions each corresponding to a speech probability score of the probability scores generated at operation 1001 such that subsequent non-speech states are connected to previous non-speech states by corresponding multiple second transitions corresponding to the speech probability scores generated at operation 1001, and such that the second non-speech state is connected to the second speech state by multiple third transitions each corresponding to the non-speech probability scores of the plurality of self loops. For example, updating the speech pattern model may include providing a continual summing at the first non-speech state based on a previous score of the first non-speech state and a maximum probability score of the non-speech probability scores of the plurality of self loops and providing a value at each of the speech states exclusive of the second speech state based on a sum of a previous score at an immediately preceding state and a maximum probability score of the speech probability scores. Furthermore, updating the speech pattern model may include providing a value of the second speech state based on a sum of a maximum of a previous score of an immediately preceding speech state and a previous score of the second speech state with a maximum probability score of the speech probability scores.

Processing continues at operation 1003, where a determination is made as to whether the received audio input includes speech based on a comparison of a score of a first non-speech state (e.g., the first non-speech state of the model) and a score of a final speech state of the multiple speech states. As discussed, a first speech state follows the first non-speech state and a second speech state follows the first speech state and precedes the second non-speech state. In an embodiment, the determination as to whether the received audio input includes speech is based on a comparison of a score of the first non-speech state and a score of the second speech state of the multiple speech states. In an embodiment, the first speech state immediately follows the first non-speech state (e.g., there are no intervening states) and the second speech state follows the first speech state (e.g., wither intervening speech states) and immediately precedes the second non-speech state (e.g., there are no intervening states). In an embodiment, the comparison of the first score of the first non-speech state and the second score of the second speech state is a comparison of a difference between the second score and the first score (e.g., the second score minus the first score) to a threshold such that the first speech state is connected to the first non-speech state by multiple first transitions each corresponding to a speech probability score of the probability scores generated at operation 1001 and the second non-speech state is connected to the second speech state by multiple second transitions each corresponding to a non-speech probability score of the probability scores generated at operation 1001. For example, if the difference compares favorably (e.g., exceeds or is equal to or greater than) the threshold, speech is detected. If the difference does compare favorably to the threshold, speech is not detected.

In an embodiment, process 1000 further includes detecting an end of speech for a speech signal based on a third score of the second non-speech state exceeding the second score. For example, detecting the end of speech may include determining a score of the second non-speech state exceeds a score of the second speech state for a majority of a plurality of consecutive speech model pattern updates (e.g., three of five consecutive updates, where the three need not be consecutive). In an embodiment, process 1000 further includes detecting, based on a prior updating of the speech pattern model, a beginning of speech for the speech signal based on a fourth score of the first speech state exceeding a fifth score of the first non-speech state.

Processing continues at operation 1004, where a speech detection indicator is provided when the received audio input comprises speech. The speech detection indicator may include any suitable indicators such as a flag indicating speech, a begin of speech time, time stamp, or audio frame, an end of speech time, time stamp, or audio frame, etc. In some embodiments, process 1000 further includes performing an action based on the speech detection indicator(s) such as powering up an audio buffer, performing automatic speech recognition, transmitting detected speech (e.g., as an audio file) to a remote device for processing, performing speech processing on the detected speech signal, or stopping transmission of recorded audio to a remote device.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Techniques discussed herein improve the performance of an audio device, system, or computer system and pertain to receiving audio input and providing an indication of whether or not the audio input includes speech. Such an indication is an important indicator corresponding to the audio input and may be used as discussed herein to improve the operation of the device. The discussed techniques and systems provide for improved speech detection quality using fewer calculations and device power for improved device performance. Compared to voice activity detection, the discussed techniques significantly improve detection of speech accuracy (e.g., by about 10% to 50% depending on the environment of the speech with greater improvement in noisier environments such as cars or other transportation vehicles and cafeterias or other populated environments) and detection of non-speech accuracy (e.g., by about 5% to 10% depending on the environment of the non-speech with greater improvement in quieter environments).

Figure 12:
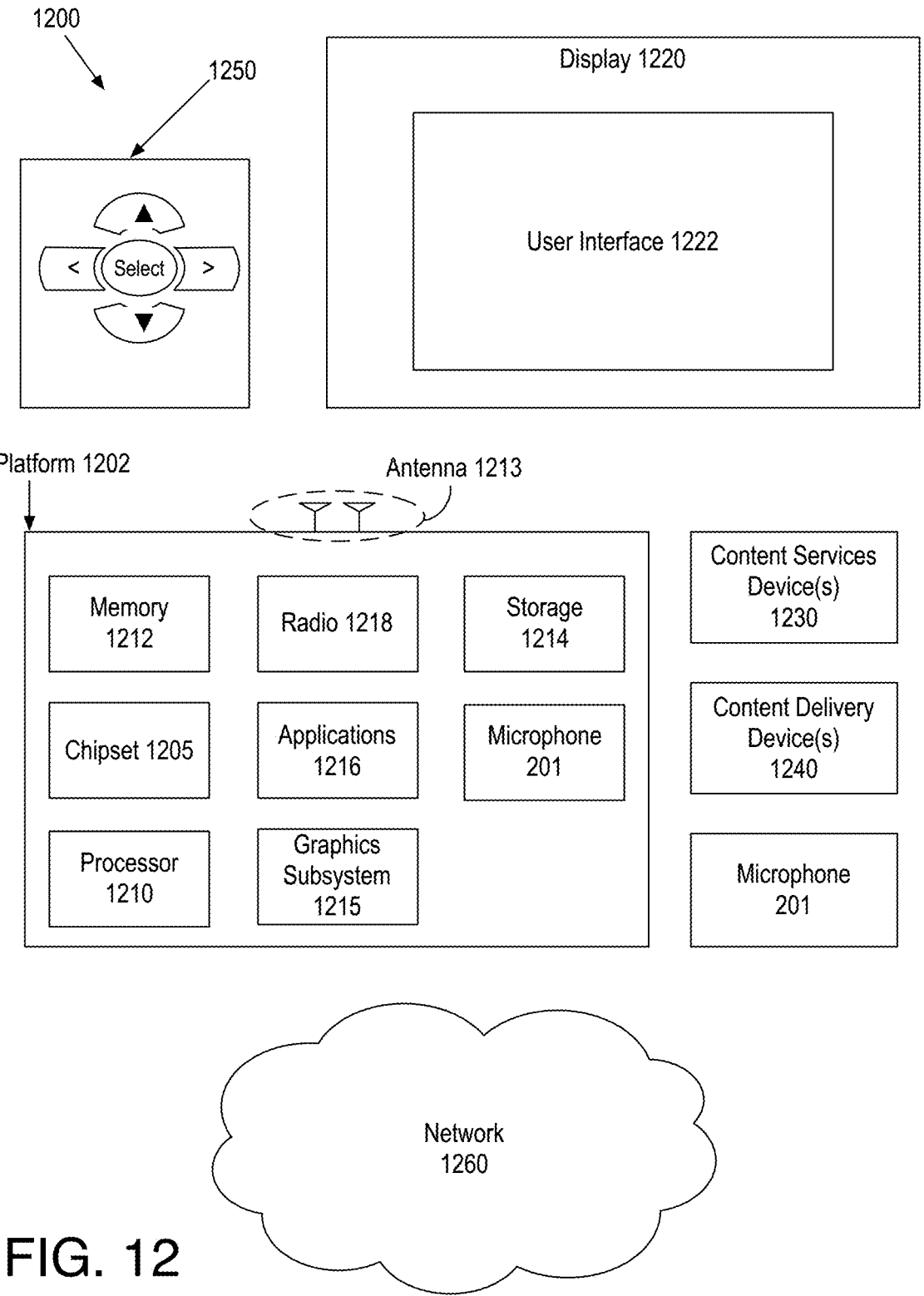
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. As shown, in some examples, system 1200 may include microphone 201 implemented via platform 1202. Platform 1202 may receive input speech via microphone 201 as discussed herein. A navigation controller 1250 including one or more navigation features may be used to interact with, for example, platform 1202 and/or display 1220. Each of these components is described in greater detail below.

In various implementations, system 1200 may provide key phrase detection as described. For example, key phrase detection may be provide wake on voice capability for a device or environment as described. In other implementations, system 1200 may provide for generating a key phrase detection model (e.g., including an acoustic model, a rejection model, and a key phrase model). Such training may be performed offline prior to key phrase detection for example.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1215. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
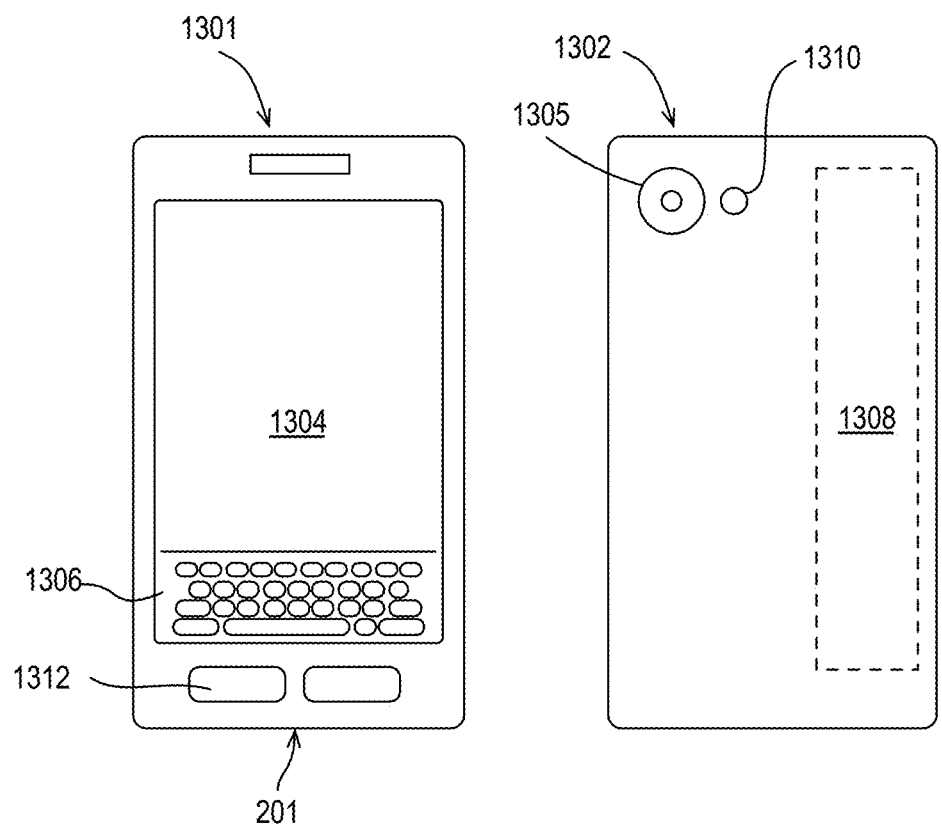
FIG. 13 illustrates an example device, all arranged in accordance with at least some implementations of the present disclosure.

As described above, system 1200 may be embodied in varying physical styles or form factors. FIG. 13 illustrates implementations of a small form factor device, arranged in accordance with at least some implementations of the present disclosure. In some examples, system 1200 may be implemented via device 1300. In other examples, other devices or systems, or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone 201, or may be digitized by a voice recognition device. As shown, device 1300 may include a camera 1305 (e.g., including a lens, an aperture, and an imaging sensor) and a flash 1310 integrated into back 1302 (or elsewhere) of device 1300.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed is:

1. A speech detection system comprising:
   a memory to store received audio input; and
   a processor coupled to the memory, the processor to:
      generate, via acoustic scoring of an acoustic model based on the received audio input, a plurality of probability scores each for a corresponding audio unit;
      update a speech pattern model based on at least some of the probability scores to generate a score for each state of the speech pattern model, wherein the speech pattern model comprises a first non-speech state comprising a plurality of self loops each associated with a non-speech probability score of the probability scores, a plurality of speech states following the first non-speech state, and a second non-speech state following the speech states, wherein the speech states comprise a first speech state following and connected to the first non-speech state by a plurality of first transitions each corresponding to a speech probability score of the probability scores and a second speech state following the first speech state and preceding the second non-speech state;
      determine whether the received audio input comprises speech based on a comparison of a first score of the first non-speech state and a second score of the second speech state; and
      provide a speech detection indicator when the received audio input comprises speech.

2. The speech detection system of claim 1, wherein the comparison of the first score and the second score comprises a comparison of a difference between the second score and the first score to a threshold, and wherein the second non-speech state is connected to the second speech state by a plurality of second transitions each corresponding to a non-speech probability score of the probability scores.

3. The speech detection system of claim 1, the processor further to:
   detect an end of speech for a speech signal based on a third score of the second non-speech state exceeding the second score.

4. The speech detection system of claim 3, wherein the processor to detect the end of speech comprises the processor to determine a score of the second non-speech state exceeds a score of the second speech state for a majority of a plurality of consecutive speech pattern model updates.

5. The speech detection system of claim 3, the processor further to:
   detect, based on a prior updating of the speech pattern model, a beginning of speech for the speech signal based on a fourth score of the first speech state exceeding a fifth score of the first non-speech state; and
   provide temporal indicators of the speech signal based on the beginning of speech and the end of speech.

6. The speech detection system of claim 1, the processor further to:
   train a second acoustic model, wherein the second acoustic model comprises a plurality of output nodes each corresponding to one of noise, silence, or sub-phonetic units each associated with one of a plurality of monophones;
   determine a usage rate for each of the sub-phonetic units during the training;
   determine a selected output node corresponding to a highest usage rate sub-phonetic unit for each of the plurality of monophones; and
   include, in the acoustic model, the selected output nodes corresponding to the highest usage rate sub-phonetic units and discard remaining output nodes corresponding to the sub-phonetic units.

7. The speech detection system of claim 1, wherein the second non-speech state is a silence state connected to the second speech state by a plurality of transitions each corresponding to a silence score of the plurality of scores.

8. The speech detection system of claim 1, wherein the speech pattern model comprises one or more third non-speech states immediately following the second speech state and immediately preceding the second non-speech state, wherein one of the third non-speech states is connected to the second non-speech state by a plurality of transitions each corresponding to the non-speech probability scores of the plurality of self loops.

9. The speech detection system of claim 1, wherein speech states subsequent to the first speech state are connected to previous speech states by corresponding pluralities of second transitions corresponding to the speech probability scores, and wherein the second non-speech state is connected to the second speech state by a plurality of third transitions each corresponding to the non-speech probability scores of the plurality of self loops.

10. The speech detection system of claim 9, wherein the processor to update the speech pattern model comprises the processor to:
    provide a continual summing at the first non-speech state based on a previous score of the first non-speech state and a maximum probability score of the non-speech probability scores of the plurality of self loops; and
    provide a value at each of the speech states exclusive of the second speech state based on a sum of a previous score at an immediately preceding state and a maximum probability score of the speech probability scores.

11. The speech detection system of claim 10, wherein the processor to update the speech pattern model further comprises the processor to:
    provide a value of the second speech state based on a sum of a maximum of a previous score of an immediately preceding speech state and a previous score of the second speech state with a maximum probability score of the speech probability scores.

12. The speech detection system of claim 1, wherein the acoustic model comprises a deep neural network and generating the plurality of probability scores comprises scoring a feature vector comprising a stack of a time series of coefficients each associated with a sampling time.

13. A computer-implemented method for speech detection comprising:
generating, via acoustic scoring of an acoustic model based on received audio input, a plurality of probability scores each for a corresponding audio unit;
updating a speech pattern model based on at least some of the probability scores to generate a score for each state of the speech pattern model, wherein the speech pattern model comprises a first non-speech state comprising a plurality of self loops each associated with a non-speech probability score of the probability scores, a plurality of speech states following the first non-speech state, and a second non-speech state following the speech states, wherein the speech states comprise a first speech state following and connected to the first non-speech state by a plurality of first transitions each corresponding to a speech probability score of the probability scores and a second speech state following the first speech state and preceding the second non-speech state;
determining whether the received audio input comprises speech based on a comparison of a first score of the first non-speech state and a second score of the second speech state; and
providing a speech detection indicator when the received audio input comprises speech.

14. The method of claim 13, wherein the comparison of the first score and the second score comprises a comparison of a difference between the second score and the first score to a threshold, and wherein the second non-speech state is connected to the second speech state by a plurality of second transitions each corresponding to a non-speech probability score of the probability scores.

15. The method of claim 13, further comprising:
detecting an end of speech for a speech signal based on a third score of the second non-speech state exceeding the second score, wherein detecting the end of speech comprises determining a score of the second non-speech state exceeds a score of the second speech state for a majority of a plurality of consecutive speech pattern model updates.

16. The method of claim 15, further comprising:
detecting, based on a prior updating of the speech pattern model, a beginning of speech for the speech signal based on a fourth score of the first speech state exceeding a fifth score of the first non-speech state; and
providing temporal indicators of the speech signal based on the beginning of speech and the end of speech.

17. The method of claim 13, wherein speech states subsequent to the first speech state are connected to previous speech states by corresponding pluralities of second transitions corresponding to the speech probability scores, wherein the second non-speech state is connected to the second speech state by a plurality of third transitions each corresponding to the non-speech probability scores of the plurality of self loops.

18. The method of claim 17, wherein updating the speech pattern model comprises:
providing a continual summing at the first non-speech state based on a previous score of the first non-speech state and a maximum probability score of the non-speech probability scores of the plurality of self loops; and
providing a value at each of the speech states exclusive of the second speech state based on a sum of a previous score at an immediately preceding state and a maximum probability score of the speech probability scores.

19. The method of claim 18, wherein updating the speech pattern model further comprises:
providing a value of the second speech state based on a sum of a maximum of a previous score of an immediately preceding speech state and a previous score of the second speech state with a maximum probability score of the speech probability scores.

20. At least one non-transitory machine readable medium comprising a plurality of instructions that, in response to being executed on a device, cause the device to speech detection by:
generating, via acoustic scoring of an acoustic model based on received audio input, a plurality of probability scores each for a corresponding audio unit;
updating a speech pattern model based on at least some of the probability scores to generate a score for each state of the speech pattern model, wherein the speech pattern model comprises a first non-speech state comprising a plurality of self loops each associated with a non-speech probability score of the probability scores, a plurality of speech states following the first non-speech state, and a second non-speech state following the speech states, wherein the speech states comprise a first speech state following and connected to the first non-speech state by a plurality of first transitions each corresponding to a speech probability score of the probability scores and a second speech state following the first speech state and preceding the second non-speech state;
determining whether the received audio input comprises speech based on a comparison of a first score of the first non-speech state and a second score of the second speech state; and
providing a speech detection indicator when the received audio input comprises speech.

21. The non-transitory machine readable medium of claim 20, wherein the comparison of the first score and the second score comprises a comparison of a difference between the second score and the first score to a threshold, and wherein the second non-speech state is connected to the second speech state by a plurality of second transitions each corresponding to a non-speech probability score of the probability scores.

22. The non-transitory machine readable medium of claim 20, the machine readable medium further comprising instructions that, in response to being executed on the device, cause the device to perform speech detection by:
detecting an end of speech for a speech signal based on a third score of the second non-speech state exceeding the second score, wherein detecting the end of speech comprises determining a score of the second non-speech state exceeds a score of the second speech state for a majority of a plurality of consecutive speech pattern model updates.

23. The non-transitory machine readable medium of claim 22, the machine readable medium further comprising instructions that, in response to being executed on the device, cause the device to perform speech detection by:
detecting, based on a prior updating of the speech pattern model, a beginning of speech for the speech signal based on a fourth score of the first speech state exceeding a fifth score of the first non-speech state; and providing temporal indicators of the speech signal based on the beginning of speech and the end of speech.

24. The non-transitory machine readable medium of claim 20, wherein speech states subsequent to the first speech state are connected to previous speech states by corresponding pluralities of second transitions corresponding to the speech probability scores, wherein the second non-speech state is connected to the second speech state by a plurality of third transitions each corresponding to the non-speech probability scores of the plurality of self loops.

25. The non-transitory machine readable medium of claim 24, wherein updating the speech pattern model comprises:

providing a continual summing at the first non-speech state based on a previous score of the first non-speech state and a maximum probability score of the non-speech probability scores of the plurality of self loops; and providing a value at each of the speech states exclusive of the second speech state based on a sum of a previous score at an immediately preceding state and a maximum probability score of the speech probability scores.

* * * * *